(12) United States Patent
Lee et al.

(10) Patent No.: US 12,510,730 B2
(45) Date of Patent: Dec. 30, 2025

(54) OPTICAL LENS ASSEMBLY AND PHOTOGRAPHING MODULE

(71) Applicant: NEWMAX TECHNOLOGY CO., LTD., Taichung (TW)

(72) Inventors: Chun-Sheng Lee, Taichung (TW); Ching-Yun Huang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 328 days.

(21) Appl. No.: 18/229,635

(22) Filed: Aug. 2, 2023

(65) Prior Publication Data
US 2024/0402463 A1 Dec. 5, 2024

(30) Foreign Application Priority Data
May 29, 2023 (TW) ................... 112119882

(51) Int. Cl.
*G02B 9/60* (2006.01)
*G02B 7/02* (2021.01)
*G02B 13/00* (2006.01)

(52) U.S. Cl.
CPC ............... *G02B 9/60* (2013.01); *G02B 7/021* (2013.01); *G02B 13/0045* (2013.01)

(58) Field of Classification Search
CPC ........................................................ G02B 9/60
See application file for complete search history.

(56) References Cited

U.S. PATENT DOCUMENTS

| | | | | |
|---|---|---|---|---|
| 9,864,172 | B1 * | 1/2018 | Tsai | G02B 9/60 |
| 2017/0146811 | A1 * | 5/2017 | Son | G02B 27/646 |
| 2017/0168264 | A1 * | 6/2017 | Chen | G02B 9/60 |
| 2019/0011671 | A1 * | 1/2019 | Huang | G02B 13/06 |
| 2020/0379217 | A1 * | 12/2020 | Huang | G02B 13/04 |
| 2021/0382274 | A1 * | 12/2021 | Lee | G02B 9/60 |
| 2022/0121006 | A1 * | 4/2022 | Huang | G02B 13/0045 |

* cited by examiner

*Primary Examiner* — Edmond C Lau
(74) *Attorney, Agent, or Firm* — Juan Carlos A. Marquez; Marquez IP Law Office, PLLC

(57) ABSTRACT

An optical lens assembly includes a stop, and includes, in order from the object side to the image side: a first lens, a second lens, a third lens, a fourth lens, and fifth lens, wherein a focal length of the fifth lens is f5, a radius of curvature of an image-side surface of the fifth lens is R10, a distance between the stop to the image plane on the optical axis is SL, satisfying the relation:

$$1.27 < f5 * R10 / SL < 3.68.$$

20 Claims, 15 Drawing Sheets

OPTICAL LENS ASSEMBLY AND PHOTOGRAPHING MODULE

CROSS-REFERENCE TO RELATED APPLICATION

This application claims the benefit of Taiwan Patent Application No. 112119882, filed on May 29, 2023, which is hereby incorporated by reference for all purposes as if fully set forth herein.

BACKGROUND

Technical Field

The present disclosure relates to an optical lens assembly and a photographing module, and in particular, to an optical lens assembly and a photographing module applicable to an electronic device.

Related Art

In today's age of rapid developed technology, 3D sensing technology has been widely used in mobile phones, drones, sweeping robots and other fields. However, in these technological applications, in order to achieve better image effects, the lens module must have the characteristics of a large optical aperture and a wide angle of view, thereby capturing more light and a wider field of view, wherein the excellent performance of the lens module plays an important role in the development of 3D sensing technology.

At present, most lens module designs of TOF (Time-of-Flight) that are used for super large apertures and large angle of view require long length of the lens module and are prone to distortion. The factor of long length of the lens module has a negative impact on image quality. In addition, there is short length of the lens module, but they often need to sacrifice the view angle and relative illumination, which cannot meet the requirements of some special technological applications. Therefore, how to achieve large view angle, high relative illuminance and miniaturized lens module is one of the important directions of current optical lens module research.

SUMMARY

An objective of the present disclosure is to resolve the above problems of the prior art. In order to achieve the above objective, the present disclosure provides an optical lens assembly comprising a stop, and in order from an object side to an image side, comprising: a first lens with negative refractive power; a second lens with positive refractive power, comprising an object-side surface and an image-side surface, wherein the object-side surface of the second lens is convex near the optical axis, and the image-side surface of the second lens is convex near the optical axis; a third lens with negative refractive power, comprising an object-side surface and an image-side surface, wherein the image-side surface of the third lens is concave near the optical axis; a fourth lens with positive refractive power; and a fifth lens with positive refractive power, comprising an object-side surface and an image-side surface, wherein the object-side surface of the fifth lens is convex near the optical axis, and the image-side surface of the fifth lens is concave near the optical axis.

A total quantity of lenses with refractive power in the optical lens assembly is five. A focal length of the fifth lens is f5, a curvature radius of an image-side surface of the fifth lens is R10, a distance from the stop to the image plane along the optical axis is SL, and the following conditions are satisfied:

$$1.27(\text{mm}) < f5*R10/SL < 3.68(\text{mm}).$$

When the optical lens assembly satisfies the conditions of 1.27 (mm)<f5*R10/SL<3.68 (mm), the aberration of the optical lens assembly can be corrected by more suitable refractive power distribution of the optical lens assembly, so as to improving the image quality of the optical lens assembly.

A maximum image height of the optical lens assembly is IMH, an entrance pupil diameter of the optical lens assembly is EPD, and the following conditions are satisfied: 1.18<IMH/EPD<2.03. In this way, the optical lens assembly has a relatively large amount of incident light by the proper configuration of the maximum image height and the entrance pupil diameter.

A central thickness of the second lens along the optical axis is CT2, a central thickness of the third lens along the optical axis is CT3, a central thickness of the fourth lens along the optical axis is CT4, and the following condition is satisfied:

$$3.10 < (CT2+CT4)/CT3 < 7.05.$$

In this way, the formability of optical lens assembly can be optimally balanced to be easily manufactured by the proper configuration of these lens thicknesses.

A focal length of the fifth lens is f5, a distance from the image-side surface of the second lens to the object-side surface of the third lens along the optical axis is T23, a distance from the image-side surface of the third lens to the object-side surface of the fourth lens along the optical axis is T34, a distance from the image-side surface of the fourth lens to the object-side surface of the fifth lens along the optical axis is T45, and the following condition is satisfied:

$$3.53(\text{mm}) < (f5*T45)/(T23+T34) < 10.14(\text{mm}).$$

In this way, the space configuration of the optical lens assembly is more appropriate, so as to achieve the effects of reducing space and reducing the height of the lens module.

A curvature radius of an object-side surface of the first lens is R1, a central thickness of the first lens along the optical axis is CT1, a distance from the image-side surface of the first lens to the object-side surface of the second lens along the optical axis is T12, and the following condition is satisfied:

$$-74.49 < R1/(CT1+T12) < 290.59.$$

In this way, the formability of optical lens assembly can be optimally balanced to be easily manufactured.

A distance from the stop to the image plane along the optical axis is SL, a maximum image height of the optical lens assembly is IMH, and the following condition is satisfied:

$$1.87 < SL/IMH < 3.14.$$

In this way, the space configuration of the optical lens assembly is more appropriate, so as to achieve the effects of reducing space of the optical lens assembly and reducing the height of the lens module.

A distance from the object-side surface of the first lens to an image plane along the optical axis is TL, a maximum image height of the optical lens assembly is IMH, and the following conditions are satisfied:

$$2.89 < TL/IMH < 5.50.$$

In this way, this proper configuration helps to obtain a proper balance of the active area of image plane while the optical lens assembly is miniaturized.

A distance from the stop to the image plane along the optical axis is SL, a focal length of the optical lens assembly is f, and the following conditions are satisfied: $2.20<SL/f<3.67$. In this way, the space configuration of the optical lens assembly is more appropriate, so as to achieve the effects of reducing space of the optical lens assembly and reducing the height of the lens module.

A half of a maximum field of view of the optical lens assembly is HFOV, a focal length of the fifth lens is f5, a curvature radius of an image-side surface of the fifth lens is R10, and the following conditions are satisfied:

$$4.66<\tan(HFOV)*f5/R10<12.04.$$

In this way, the optical lens assembly can still maintain better image quality under a large angle of view, and it is helpful to realize the effect of miniaturization.

A distance from the object-side surface of the first lens to an image plane along the optical axis is TL, a distance from the image-side surface of the fifth lens to the image plane along the optical axis is BFL, a maximum image height of the optical lens assembly is IMH, a focal length of the optical lens assembly is f, and the following conditions are satisfied:

$$2.71(mm)<(TL-BFL)/IMH*f<5.45(mm).$$

In this way, the spatial configuration of the optical lens assembly can be optimized, and the height of the lens module can be reduced.

A distance from the object-side surface of the first lens to an image plane along the optical axis is TL, a distance from the stop to the image plane along the optical axis is SL, a maximum image height of the optical lens assembly is IMH, and the following conditions are satisfied:

$$1.02<(TL-SL)/IMH<2.36.$$

In this way, the spatial configuration of the optical lens assembly can be optimized, and the height of the lens module can be reduced.

A focal length of the second lens is f2, a focal length of the fifth lens is f5, a focal length of the optical lens assembly is f, a distance from the stop to the image plane along the optical axis is SL, and the following conditions are satisfied:

$$5.64<(f5/f2)/(f/SL)<17.98.$$

In this way, the appropriate distribution of the refractive power of the lenses is beneficial to correct the aberration of the optical lens assembly and improve the image quality of the optical lens assembly.

A focal length of the optical lens assembly is f, a maximum image height of the optical lens assembly is IMH, a curvature radius of the object-side surface of the first lens is R1, a curvature radius of an image-side surface of the fifth lens is R10, and the following conditions are satisfied:

$$-115.18<f/IMH*(R1/R10)<445.89.$$

In this way, the refractive power and the curvature of the lenses of the optical lens assembly reach an optimal ratio, which is beneficial to correct the aberration of the optical lens assembly and improve the image quality of the optical lens assembly.

An entrance pupil diameter of the optical lens assembly is EPD, a curvature radius of the object-side surface of the third lens is R5, a distance from the object-side surface of the first lens to an image plane along the optical axis is TL, a maximum image height of the optical lens assembly is IMH, and the following conditions are satisfied:

$$-40.32(mm*mm)<EPD*R5/(TL/IMH)<21.89 \ (mm*mm).$$

In this way, the proper configuration helps to obtain a proper balance of the active area of image plane while the optical lens assembly is miniaturized.

A central thickness of the second lens along the optical axis is CT2, a central thickness of the third lens along the optical axis is CT3, a central thickness of the fourth lens along the optical axis is CT4, a central thickness of the fifth lens along the optical axis is CT5, and the following condition is satisfied:

$$0.61<(CT2+CT3)/(CT4+CT5)<1.13.$$

In this way, the performance of the optical lens assembly and the formability of the lenses can be taken into account to be easily manufactured by properly adjusting the thickness distribution of the lenses.

A central thickness of the first lens along the optical axis is CT1, a central thickness of the third lens along the optical axis is CT3, a central thickness of the fourth lens along the optical axis is CT4, a central thickness of the fifth lens along the optical axis is CT5, and the following condition is satisfied:

$$0.42<CT4/(CT1+CT3+CT5)<0.94.$$

In this way, the performance of the optical lens assembly and the formability of the lenses can be taken into account to be easily manufactured by properly adjusting the thickness distribution of the lenses.

In addition, the present disclosure further provides a photographing module. The photographing module comprises: a lens barrel; an optical lens assembly disposed in the lens barrel; and an image sensor disposed on an image plane of the optical lens assembly.

The optical lens assembly comprises a stop, and in order from an object side to an image side, comprises: a first lens with negative refractive power; a second lens with positive refractive power, comprising an object-side surface and an image-side surface, wherein the object-side surface of the second lens is convex near the optical axis, and the image-side surface of the second lens is convex near the optical axis; a third lens with negative refractive power, comprising an object-side surface and an image-side surface, wherein the image-side surface of the third lens is concave near the optical axis; a fourth lens with positive refractive power; and a fifth lens with positive refractive power, comprising an object-side surface and an image-side surface, wherein the object-side surface of the fifth lens is convex near the optical axis, and the image-side surface of the fifth lens is concave near the optical axis.

A total quantity of lenses with refractive power in the optical lens assembly is five. A focal length of the fifth lens is f5, a curvature radius of an image-side surface of the fifth lens is R10, a distance from the stop to the image plane along the optical axis is SL, and the following conditions are satisfied:

$$1.27(mm)<f5*R10/SL<3.68(mm).$$

When the optical lens assembly satisfies the conditions of $$1.27(mm)<f5*R10/SL<3.68(mm),$$

the aberration of the optical lens assembly can be corrected by more suitable refractive power distribution of the optical lens assembly, so as to improving the image quality of the optical lens assembly.

A maximum image height of the optical lens assembly is IMH, an entrance pupil diameter of the optical lens assembly is EPD, and the following conditions are satisfied:

$$1.18 < IMH/EPD < 2.03.$$

In this way, the optical lens assembly has a relatively large amount of incident light by the proper configuration of the maximum image height and the entrance pupil diameter.

A central thickness of the second lens along the optical axis is CT2, a central thickness of the third lens along the optical axis is CT3, a central thickness of the fourth lens along the optical axis is CT4, and the following condition is satisfied:

$$3.10 < (CT2+CT4)/CT3 < 7.05.$$

In this way, the formability of optical lens assembly can be optimally balanced to be easily manufactured by the proper configuration of these lens thicknesses.

A focal length of the fifth lens is f5, a distance from the image-side surface of the second lens to the object-side surface of the third lens along the optical axis is T23, a distance from the image-side surface of the third lens to the object-side surface of the fourth lens along the optical axis is T34, a distance from the image-side surface of the fourth lens to the object-side surface of the fifth lens along the optical axis is T45, and the following condition is satisfied:

$$3.53(mm) < (f5*T45)/(T23+T34) < 10.14(mm).$$

In this way, the space configuration of the optical lens assembly is more appropriate, so as to achieve the effects of reducing space and reducing the height of the lens module.

A curvature radius of an object-side surface of the first lens is R1, a central thickness of the first lens along the optical axis is CT1, a distance from the image-side surface of the first lens to the object-side surface of the second lens along the optical axis is T12, and the following condition is satisfied:

$$-74.49 < R1/(CT1+T12) < 290.59.$$

In this way, the formability of optical lens assembly can be optimally balanced to be easily manufactured.

A distance from the stop to the image plane along the optical axis is SL, a maximum image height of the optical lens assembly is IMH, and the following condition is satisfied:

$$1.87 < SL/IMH < 3.14.$$

In this way, the space configuration of the optical lens assembly is more appropriate, so as to achieve the effects of reducing space of the optical lens assembly and reducing the height of the lens module.

A distance from the object-side surface of the first lens to an image plane along the optical axis is TL, a maximum image height of the optical lens assembly is IMH, and the following conditions are satisfied:

$$2.89 < TL/IMH < 5.50.$$

In this way, this proper configuration helps to obtain a proper balance of the active area of image plane while the optical lens assembly is miniaturized.

A distance from the stop to the image plane along the optical axis is SL, a focal length of the optical lens assembly is f, and the following conditions are satisfied:

$$2.20 < SL/f < 3.67.$$

In this way, the space configuration of the optical lens assembly is more appropriate, so as to achieve the effects of reducing space of the optical lens assembly and reducing the height of the lens module.

A half of a maximum field of view of the optical lens assembly is HFOV, a focal length of the fifth lens is f5, a curvature radius of an image-side surface of the fifth lens is R10, and the following conditions are satisfied:

$$4.66 < \tan(HFOV)*f5/R10 < 12.04.$$

In this way, the optical lens assembly can still maintain better image quality under a large angle of view, and it is helpful to realize the effect of miniaturization.

A distance from the object-side surface of the first lens to an image plane along the optical axis is TL, a distance from the image-side surface of the fifth lens to the image plane along the optical axis is BFL, a maximum image height of the optical lens assembly is IMH, a focal length of the optical lens assembly is f, and the following conditions are satisfied:

$$2.71(mm) < (TL-BFL)/IMH*f < 5.45(mm).$$

In this way, the spatial configuration of the optical lens assembly can be optimized, and the height of the lens module can be reduced.

A distance from the object-side surface of the first lens to an image plane along the optical axis is TL, a distance from the stop to the image plane along the optical axis is SL, a maximum image height of the optical lens assembly is IMH, and the following conditions are satisfied:

$$1.02 < (TL-SL)/IMH < 2.36.$$

In this way, the spatial configuration of the optical lens assembly can be optimized, and the height of the lens module can be reduced.

A focal length of the second lens is f2, a focal length of the fifth lens is f5, a focal length of the optical lens assembly is f, a distance from the stop to the image plane along the optical axis is SL, and the following conditions are satisfied:

$$5.64 < (f5/f2)/(f/SL) < 17.98.$$

In this way, the appropriate distribution of the refractive power of the lenses is beneficial to correct the aberration of the optical lens assembly and improve the image quality of the optical lens assembly.

A focal length of the optical lens assembly is f, a maximum image height of the optical lens assembly is IMH, a curvature radius of the object-side surface of the first lens is R1, a curvature radius of an image-side surface of the fifth lens is R10, and the following conditions are satisfied:

$$-115.18 < f/IMH*(R1/R10) < 445.89.$$

In this way, the refractive power and the curvature of the lenses of the optical lens assembly reach an optimal ratio, which is beneficial to correct the aberration of the optical lens assembly and improve the image quality of the optical lens assembly.

An entrance pupil diameter of the optical lens assembly is EPD, a curvature radius of the object-side surface of the third lens is R5, a distance from the object-side surface of the first lens to an image plane along the optical axis is TL, a maximum image height of the optical lens assembly is IMH, and the following conditions are satisfied:

$$-40.32(mm*mm) < EPD*R5/(TL/IMH) < 21.89 \ (mm*mm).$$

In this way, the proper configuration helps to obtain a proper balance of the active area of image plane while the optical lens assembly is miniaturized.

A central thickness of the second lens along the optical axis is CT2, a central thickness of the third lens along the optical axis is CT3, a central thickness of the fourth lens along the optical axis is CT4, a central thickness of the fifth lens along the optical axis is CT5, and the following condition is satisfied:

$$0.61<(CT2+CT3)/(CT4+CT5)<1.13.$$

In this way, the performance of the optical lens assembly and the formability of the lenses can be taken into account to be easily manufactured by properly adjusting the thickness distribution of the lenses.

A central thickness of the first lens along the optical axis is CT1, a central thickness of the third lens along the optical axis is CT3, a central thickness of the fourth lens along the optical axis is CT4, a central thickness of the fifth lens along the optical axis is CT5, and the following condition is satisfied:

$$0.42<CT4/(CT1+CT3+CT5)<0.94.$$

In this way, the performance of the optical lens assembly and the formability of the lenses can be taken into account to be easily manufactured by properly adjusting the thickness distribution of the lenses.

DETAILED DESCRIPTION

In order to enable a person of ordinary skill in the art to understand and realize the contents of the present disclosure, the following are illustrated by proper embodiments with accompanying drawings, and the equivalent substitutions and modifications based on the contents of the present disclosure are included in the scope of the present disclosure. It is also stated that the accompanying drawings of the present disclosure are not depictions of actual dimensions, and although the present disclosure provides embodiments of particular parameters, it is to be understood that the parameters need not be exactly equal to their corresponding values, and that, within an acceptable margin of error, are approximate to their corresponding parameters. The following embodiments will further detail the technical aspects of the present disclosure, but the disclosure is not intended to limit the scope of the present disclosure.

First Embodiment

Figure 1A:
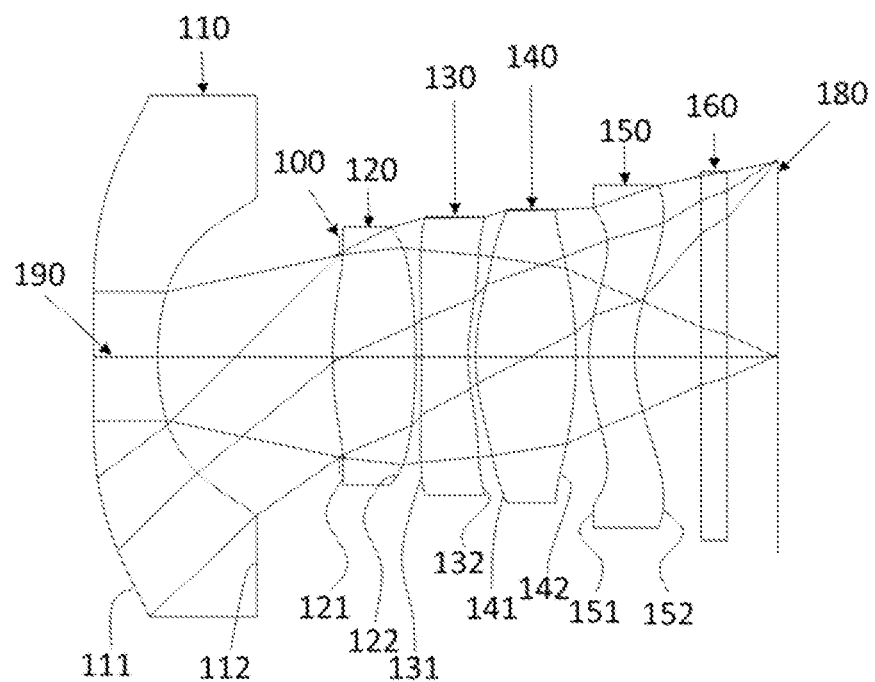
FIG. 1A is a schematic view of an optical lens assembly according to a first embodiment of the present disclosure.
Figure 1B:
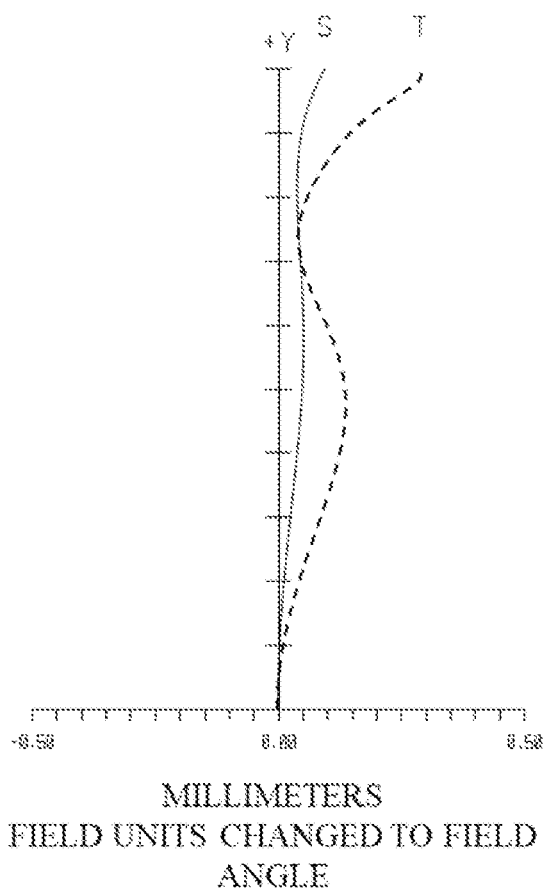
FIG. 1B sequentially shows a field curvature curve and a distortion curve of an optical lens assembly according to a first embodiment.
Figure 1B:
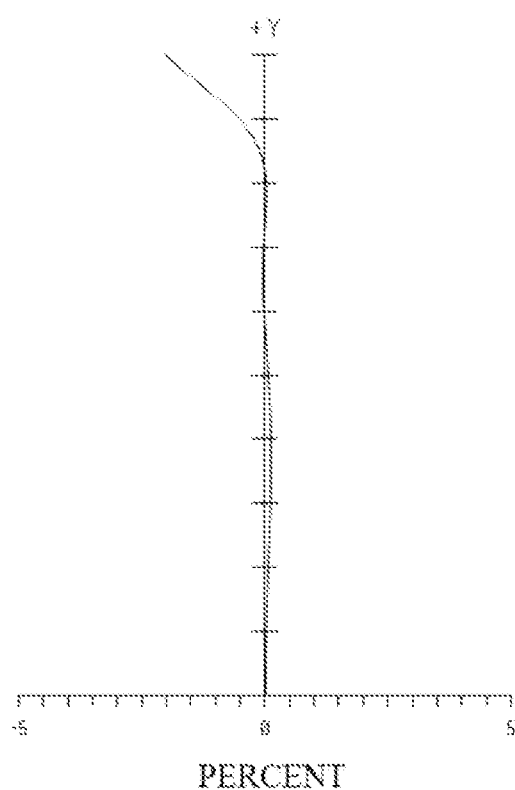

Refer to FIG. 1A and FIG. 1B. FIG. 1A is a schematic view of an optical lens assembly according to a first embodiment of the present disclosure, and FIG. 1B shows a field curvature curve and a distortion curve of an optical lens assembly according to a first embodiment. As can be seen from FIG. 1A, the optical lens assembly includes, in order from an object side to an image side: a stop 100, a first lens 110, a second lens 120, a third lens 130, a fourth lens 140, a fifth lens 150, an IR bandpass filter 160, and an image plane 180. A total quantity of lenses with refractive power in the optical lens assembly is five, but not limited thereto.

The first lens 110 with negative refractive power is made of a plastic material and includes an object-side surface 111 and an image-side surface 112, wherein the object-side surface 111 of the first lens 110 is concave near an optical axis 190, and the image-side surface 112 of the first lens 110 is concave near the optical axis 190. The object-side surface 111 and the image-side surface 112 are aspheric.

The second lens 120 with positive refractive power is made of a plastic material and includes an object-side surface 121 and an image-side surface 122, wherein the object-side surface 121 of the second lens 120 is convex near the optical axis 190, and the image-side surface 122 of the second lens 120 is convex near the optical axis 190. The object-side surface 121 and the image-side surface 122 are aspheric.

The third lens 130 with negative refractive power is made of a plastic material and includes an object-side surface 131 and an image-side surface 132, wherein the object-side surface 131 of the third lens 130 is convex near an optical axis 190, and the image-side surface 132 of the third lens 130 is concave near the optical axis 190. The object-side surface 131 and the image-side surface 132 are aspheric.

The fourth lens 140 with positive refractive power is made of a plastic material and includes an object-side surface 141 and an image-side surface 142, wherein the object-side surface 141 of the fourth lens 140 is convex near an optical axis 190, and the image-side surface 142 of the fourth lens 140 is convex near the optical axis 190. The object-side surface 141 and the image-side surface 142 are aspheric.

The fifth lens 150 with positive refractive power is made of a plastic material and includes an object-side surface 151 and an image-side surface 152, wherein the object-side surface 151 of the fifth lens 150 is convex near the optical axis 190, and the image-side surface 152 of the fifth lens 150 is concave near the optical axis 190. The object-side surface 151 and the image-side surface 152 are aspheric.

The IR bandpass filter 160 is made of glass, and is disposed between the fifth lens 150 and the image plane 180 without affecting a focal length of the optical lens assembly. It can be understood that, the IR bandpass filter 160 may also be formed on the surface of the above-mentioned lens. The IR bandpass filter 160 may also be made of other materials.

An aspheric curve equation of the above-mentioned lenses is expressed as follows:

$$z(h) = \frac{ch^2}{1 + [1-(k+1)c^2h^2]^{0.5}} + \sum (A_i) \cdot (h^i)$$

wherein, z is a position value in the direction of the optical axis 190 and with a surface vertex as a reference at a position of a height h; c is a curvature of a lens surface near the optical axis 190, and is a reciprocal of a curvature radius (R) (c=1/R), R is a curvature radius of a lens surface near the optical axis 190, h is a vertical distance between the lens surface and the optical axis 190, k is a conic constant, and Ai is an $i^{th}$ order aspheric coefficient.

In the first embodiment, a focal length of the optical lens assembly is f, an f-number of the optical lens assembly is Fno, and a maximum field of view in the optical lens assembly is FOV, and values are as follows: f=1.22 (millimeters), Fno=1.32, and FOV=98.65 (degrees).

In the optical lens assembly of the first embodiment, a focal length of the fifth lens 150 is f5, a curvature radius of an image-side surface 152 of the fifth lens 150 is R10, a distance from the stop 100 to the image plane 180 along the optical axis 190 is SL, and the following conditions are satisfied: f5*R10/SL=1.66 (mm).

In the optical lens assembly of the first embodiment, a maximum image height of the optical lens assembly is IMH, an entrance pupil diameter of the optical lens assembly is EPD, and the following conditions are satisfied: IMH/EPD=1.51.

In the optical lens assembly of the first embodiment, a central thickness of the second lens 120 along the optical axis 190 is CT2, a central thickness of the third lens 130 along the optical axis 190 is CT3, a central thickness of the fourth lens 140 along the optical axis 190 is CT4, and the following condition is satisfied: (CT2+CT4)/CT3=3.95.

In the optical lens assembly of the first embodiment, a focal length of the fifth lens 150 is f5, a distance from the image-side surface of the second lens to the object-side surface of the third lens along the optical axis is T23, a distance from the image-side surface of the third lens to the object-side surface of the fourth lens along the optical axis is T34, a distance from the image-side surface of the fourth lens to the object-side surface of the fifth lens along the optical axis is T45, and the following condition is satisfied:

$(f5*T45)/(T23+T34) = 5.21$ (mm).

In the optical lens assembly of the first embodiment, a curvature radius of an object-side surface 111 of the first lens 110 is R1, a central thickness of the first lens 110 along the optical axis 190 is CT1, a distance from the image-side surface 112 of the first lens 110 to the object-side surface 121 of the second lens 120 along the optical axis 190 is T12, and the following condition is satisfied:

$R1/(CT1+T12)=-8.97$.

In the optical lens assembly of the first embodiment, a distance from the stop to the image plane along the optical axis is SL, a maximum image height of the optical lens assembly is IMH, and the following condition is satisfied: SL/IMH=2.50.

In the optical lens assembly of the first embodiment, a distance from the object-side surface 111 of the first lens 110 to an image plane 180 along the optical axis 190 is TL, a maximum image height of the optical lens assembly is IMH, and the following conditions are satisfied: TL/IMH=3.90.

In the optical lens assembly of the first embodiment, a distance from the stop 100 to the image plane 180 along the optical axis 190 is SL, a focal length of the optical lens assembly is f, and the following conditions are satisfied:

$SL/f=2.86$.

In the optical lens assembly of the first embodiment, a half of a maximum field of view of the optical lens assembly is HFOV, a focal length of the fifth lens 150 is f5, a curvature radius of an image-side surface of the fifth lens is R10, and the following conditions are satisfied:

$\tan(\text{HFOV})*f5/R10=6.64$.

In the optical lens assembly of the first embodiment, a distance from the object-side surface 111 of the first lens 110 to an image plane 180 along the optical axis 190 is TL, a distance from the image-side surface 152 of the fifth lens 150 to the image plane 180 along the optical axis 190 is BFL, a maximum image height of the optical lens assembly is IMH, a focal length of the optical lens assembly is f, and the following conditions are satisfied:

$(TL-BFL)/IMH*f=3.77$(mm).

In the optical lens assembly of the first embodiment, a distance from the object-side surface 111 of the first lens 110 to an image plane 180 along the optical axis 190 is TL, a distance from the stop 100 to the image plane 180 along the optical axis 190 is SL, a maximum image height of the optical lens assembly is IMH, and the following conditions are satisfied:

$(TL-SL)/IMH=1.40$.

In the optical lens assembly of the first embodiment, a focal length of the second lens 120 is f2, a focal length of the fifth lens 150 is f5, a focal length of the optical lens assembly is f, a distance from the stop 100 to the image plane along the optical axis is SL, and the following conditions are satisfied:

$(f5/f2)/(f/SL)=7.16$.

In the optical lens assembly of the first embodiment, a focal length of the optical lens assembly is f, a maximum image height of the optical lens assembly is IMH, a curvature radius of the object-side surface of the first lens is R1, a curvature radius of an image-side surface of the fifth lens is R10, and the following conditions are satisfied:

$f/IMH*(R1/R10)=-14.85$.

In the optical lens assembly of the first embodiment, an entrance pupil diameter of the optical lens assembly is EPD, a curvature radius of the object-side surface of the third lens is R5, a distance from the object-side surface of the first lens to an image plane along the optical axis is TL, a maximum image height of the optical lens assembly is IMH, and the following conditions are satisfied:

$EPD*R5/(TL/IMH)=9.51$(mm*mm).

In the optical lens assembly of the first embodiment, a central thickness of the second lens along the optical axis is CT2, a central thickness of the third lens along the optical axis is CT3, a central thickness of the fourth lens along the optical axis is CT4, a central thickness of the fifth lens along the optical axis is CT5, and the following condition is satisfied:

$(CT2+CT3)/(CT4+CT5)=0.89.$

In the optical lens assembly of the first embodiment, a central thickness of the first lens along the optical axis is CT1, a central thickness of the third lens along the optical axis is CT3, a central thickness of the fourth lens along the optical axis is CT4, a central thickness of the fifth lens along the optical axis is CT5, and the following condition is satisfied:

$CT4/(CT1+CT3+CT5)=0.64.$

Refer to Table 1 and Table 2 below.

TABLE 1

First embodiment
f (focal length) = 1.22 mm (millimeters), Fno (f-number) = 1.32,
FOV (field of view) = 98.65 deg (degrees).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 200 | | | | |
| 1 | First lens | −17.107 (ASP) | 0.51 | Plastic | 1.54 | 55.99 | −2.93 |
| 2 | | 1.738 (ASP) | 1.45 | | | | |
| 3 | Stop | Infinity | −0.06 | | | | |
| 4 | Second lens | 2.442 (ASP) | 0.66 | Plastic | 1.64 | 22.47 | 2.29 |
| 5 | | −3.029 (ASP) | 0.05 | | | | |
| 6 | Third lens | 39.880 (ASP) | 0.37 | Plastic | 1.64 | 22.47 | −2.06 |
| 7 | | 1.229 (ASP) | 0.07 | | | | |
| 8 | Fourth lens | 1.287 (ASP) | 0.79 | Plastic | 1.64 | 22.47 | 1.65 |
| 9 | | −3.803 (ASP) | 0.10 | | | | |
| 10 | Fifth lens | 0.894 (ASP) | 0.36 | Plastic | 1.64 | 22.47 | 5.74 |
| 11 | | 1.007 (ASP) | 0.53 | | | | |
| 12 | IR bandpass filter | Infinity | 0.21 | Glass | 1.52 | 64.17 | |
| 13 | | Infinity | 0.40 | | | | |
| 14 | Image Plane | Infinity | — | | | | |

Reference wavelength 940 nm

TABLE 2

Aspheric coefficient

| Surface | 2 | 3 | 4 | 5 | 6 |
|---|---|---|---|---|---|
| K: | −2.0341E+02 | 4.5600E−01 | −5.3128E+00 | −3.7133E+01 | 4.1427E+01 |
| A2: | 0.0000E+00 | 0.0000E+00 | 0.0000E+00 | 0.0000E+00 | 0.0000E+00 |
| A4: | 1.1527E−01 | 1.4611E−01 | 3.6026E−01 | −3.1206E−01 | −5.7455E−01 |
| A6: | −5.9821E−02 | 1.0379E−01 | −5.1702E+00 | 3.7701E+00 | 5.9435E+00 |
| A8: | 5.2054E−02 | −6.6439E−03 | 4.1024E+01 | −2.0791E+01 | −3.1235E+01 |
| A10: | −4.2847E−02 | −4.1711E−02 | −1.9364E+02 | 5.9944E+01 | 9.0330E+01 |
| A12: | 2.2792E−02 | 7.2340E−02 | 5.4334E+02 | −1.0180E+02 | −1.5020E+02 |
| A14: | −7.1852E−03 | −4.5887E−02 | −8.8828E+02 | 1.0529E+02 | 1.4513E+02 |
| A16: | 1.2207E−03 | −1.0175E−03 | 7.6282E+02 | −6.7854E+01 | −7.8313E+01 |
| A18: | −8.6145E−05 | −1.9596E−03 | −2.3679E+02 | 2.6978E+01 | 2.0783E+01 |
| A20: | 0.0000E+00 | 0.0000E+00 | −3.4761E+01 | −5.3918E+00 | −1.8487E+00 |

| Surface | 7 | 8 | 9 | 10 | 11 |
|---|---|---|---|---|---|
| K: | −1.0746E+01 | −4.8327E+00 | −1.9405E+01 | −4.9285E+00 | −2.6786E+00 |
| A2: | 0.0000E+00 | 0.0000E+00 | 0.0000E+00 | 0.0000E+00 | 0.0000E+00 |
| A4: | −3.1691E−01 | −3.7897E−01 | −7.9508E−01 | −5.3898E−01 | −3.0331E−01 |
| A6: | 2.1117E+00 | 3.3298E+00 | 3.6707E+00 | 2.1941E+00 | 9.1205E−01 |
| A8: | −1.2108E+01 | −1.5314E+01 | −9.0687E+00 | −5.5117E+00 | −2.1846E+00 |
| A10: | 3.0546E+01 | 3.5645E+01 | 1.3250E+01 | 7.8526E+00 | 3.0846E+00 |
| A12: | −3.7679E+01 | −4.6888E+01 | −1.2162E+01 | −8.0509E+00 | −3.0173E+00 |
| A14: | 2.3262E+01 | 3.6721E+01 | 7.4152E+00 | 6.2741E+00 | 2.0842E+00 |
| A16: | −6.6390E+00 | −1.7057E+01 | −3.1419E+00 | −3.3696E+00 | −9.0875E−01 |
| A18: | 1.0483E+00 | 4.4006E+00 | 9.4053E−01 | 1.0353E+00 | 2.0231E−01 |
| A20: | −3.0251E−01 | −5.0701E−01 | −1.6038E−01 | −1.2595E−01 | −1.4247E−02 |

Table 1 shows detailed configuration data of the first embodiment in FIG. 1A. Units of the curvature radius, the central thickness, the gap, and the focal length is mm. Surfaces 0 to 14 sequentially represent surfaces from an object side to an image side. Surface 0 is a gap between an object and the first lens 110 along the optical axis 190, and surface 3 is a gap between the stop 100 and the object-side surface 111 of the second lens 120 along the optical axis 190. The object-side surface 111 of the second lens 120 is closer to the object side than the stop 100, and therefore the stop 100 is represented by a negative value. Otherwise, if the stop 100 is closer to the object side than the object-side surface 111 of the second lens 120, the stop 100 is represented by a positive value. Surfaces 1, 4, 6, 8, 10 and 12 are respectively central thicknesses of the first lens 110, the second lens 120, the third lens 130, the fourth lens 140, the fifth lens 150 and the IR bandpass filter 160 along the optical axis 190. Surfaces 2, 5, 7, 9, 11 and 13 respectively are a gap between the first lens 110 and the stop 100 along the optical axis 190, a gap between the second lens 120 and the third lens 130 along the optical axis 190, a gap between the third lens 130 and the fourth lens 140 along the optical axis 190, a gap between the fourth lens 140 and the fifth lens 150 along the optical axis 190, a gap between the fifth lens 150 and the IR bandpass filter 160 along the optical axis 190, and a gap between the IR bandpass filter 160 and the image plane 190 along the optical axis 190.

Table 2 shows aspheric data in the first embodiment. k represents a conic constant in an aspheric curve equation, and A2, A4, A6, A8, A10, A12, A14, A16, A18 and A20 are high-order aspheric coefficients. In addition, the following tables of embodiments are schematic diagrams and aberration curves corresponding to the embodiments. The definitions of data in the tables of the embodiments are the same as the definitions in Table 1 and Table 2 of the first embodiment, and are not repeated herein.

Second Embodiment

Figure 2A:
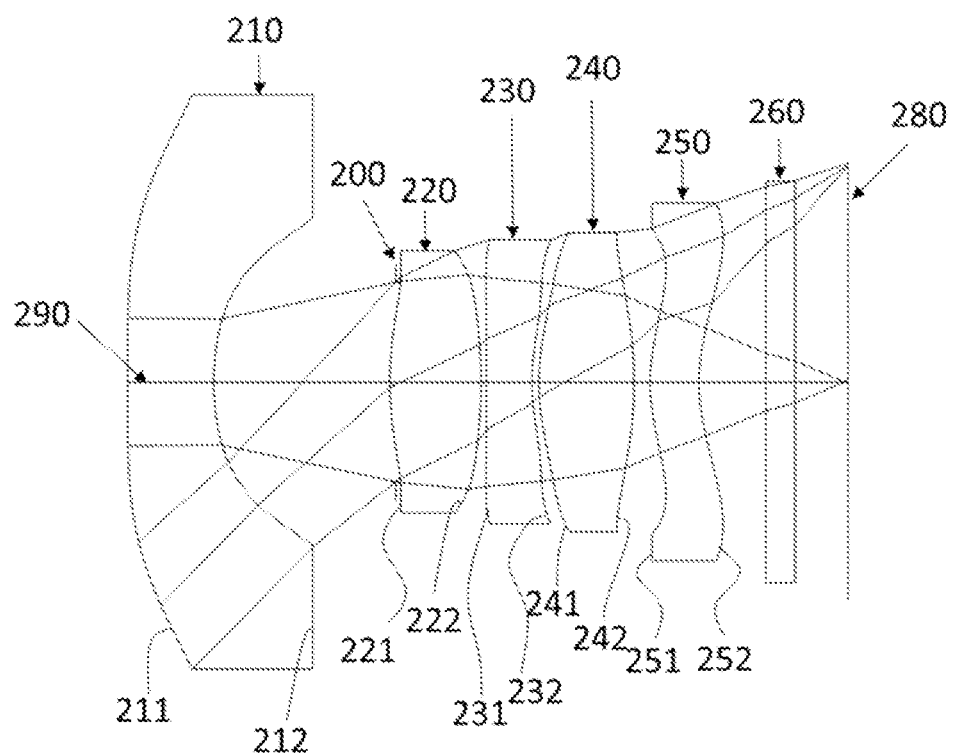
FIG. 2A is a schematic view of an optical lens assembly according to a second embodiment of the present disclosure.
Figure 2B:
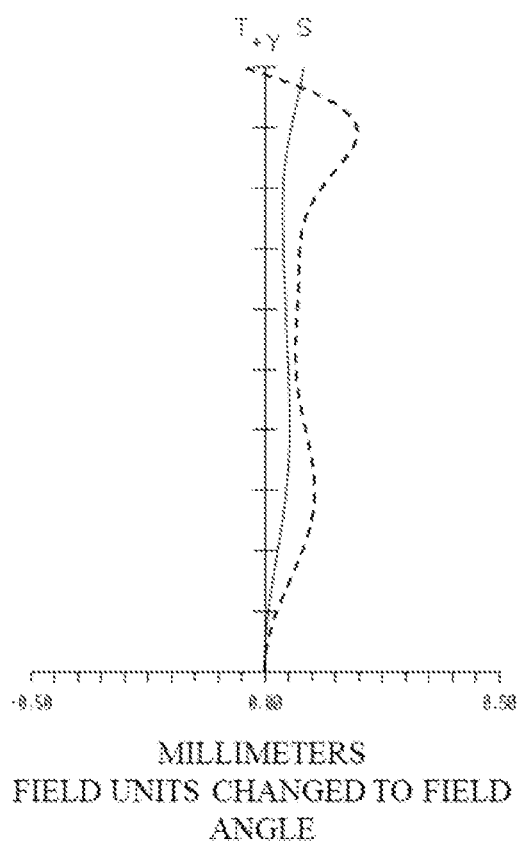
FIG. 2B sequentially shows a field curvature curve and a distortion curve of an optical lens assembly according to a second embodiment.
Figure 2B:
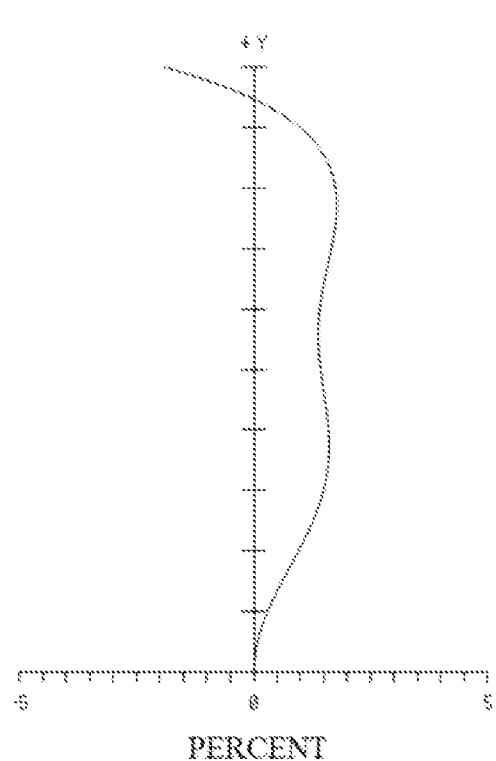

Refer to FIG. 2A and FIG. 2B. FIG. 2A is a schematic view of an optical lens assembly according to a second embodiment of the present disclosure, and FIG. 2B shows a field curvature curve and a distortion curve of an optical lens assembly according to a second embodiment. As can be seen from FIG. 2A, the optical lens assembly includes, in order from an object side to an image side: a stop 200, a first lens 210, a second lens 220, a third lens 230, a fourth lens 240, a fifth lens 250, an IR bandpass filter 260, and an image plane 280. A total quantity of lenses with refractive power in the optical lens assembly is five, but not limited thereto.

The first lens 210 with negative refractive power is made of a plastic material and includes an object-side surface 211 and an image-side surface 212, wherein the object-side surface 211 of the first lens 210 is concave near an optical axis 290, and the image-side surface 212 of the first lens 210 is concave near the optical axis 290. The object-side surface 211 and the image-side surface 212 are aspheric.

The second lens 220 with positive refractive power is made of a plastic material and includes an object-side surface 221 and an image-side surface 222, wherein the object-side surface 221 of the second lens 220 is convex near the optical axis 290, and the image-side surface 222 of the second lens 220 is convex near the optical axis 290. The object-side surface 221 and the image-side surface 222 are aspheric.

The third lens 230 with negative refractive power is made of a plastic material and includes an object-side surface 231 and an image-side surface 232, wherein the object-side surface 231 of the third lens 230 is convex near an optical axis 290, and the image-side surface 232 of the third lens 230 is concave near the optical axis 290. The object-side surface 231 and the image-side surface 232 are aspheric.

The fourth lens 240 with positive refractive power is made of a plastic material and includes an object-side surface 241 and an image-side surface 242, wherein the object-side surface 241 of the fourth lens 240 is convex near an optical axis 290, and the image-side surface 242 of the fourth lens 240 is convex near the optical axis 290. The object-side surface 241 and the image-side surface 242 are aspheric.

The fifth lens 250 with positive refractive power is made of a plastic material and includes an object-side surface 251 and an image-side surface 252, wherein the object-side surface 251 of the fifth lens 250 is convex near the optical axis 290, and the image-side surface 252 of the fifth lens 250 is concave near the optical axis 290. The object-side surface 251 and the image-side surface 252 are aspheric.

The IR bandpass filter 260 is made of glass, and is disposed between the fifth lens 250 and the image plane 280 without affecting a focal length of the optical lens assembly. It can be understood that, the IR bandpass filter 260 may also be formed on the surface of the above-mentioned lens. The IR bandpass filter 260 may also be made of other materials. Refer to Table 3 and Table 4 below.

TABLE 3

Second embodiment
f (focal length) = 1.19 mm (millimeters), Fno (f-number) = 1.43,
FOV (field of view) = 100.40 deg (degree)

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 200 | | | | |
| 2 | First lens | −60.014 (ASP) | 0.64 | Plastic | 1.54 | 55.99 | −2.70 |
| 3 | | 1.487 (ASP) | 1.36 | | | | |
| | Stop | Infinity | −0.04 | | | | |
| 4 | Second lens | 2.264 (ASP) | 0.68 | Plastic | 1.64 | 22.47 | 2.12 |
| 5 | | −2.776 (ASP) | 0.04 | | | | |
| 6 | Third lens | 71.658 (ASP) | 0.34 | Plastic | 1.64 | 22.47 | −1.89 |
| 7 | | 1.153 (ASP) | 0.05 | | | | |
| 8 | Fourth lens | 1.240 (ASP) | 0.71 | Plastic | 1.64 | 22.47 | 1.54 |
| 9 | | −3.248 (ASP) | 0.12 | | | | |
| 10 | Fifth lens | 0.918 (ASP) | 0.37 | Plastic | 1.64 | 22.47 | 6.33 |
| 11 | | 1.014 (ASP) | 0.50 | | | | |

TABLE 3-continued

Second embodiment
f (focal length) = 1.19 mm (millimeters), Fno (f-number) = 1.43,
FOV (field of view) = 100.40 deg (degree)

| Surface | | Curvature radius (mm) | Central thickness/gap (mm) | Material | Refractive index (nd) | Abbe number (vd) | Focal length (mm) |
|---|---|---|---|---|---|---|---|
| 12 | IR bandpass filter | Infinity | 0.21 | Glass | 1.52 | 64.17 | |
| 13 | | Infinity | 0.40 | | | | |
| 14 | Image Plane | Infinity | — | | | | |

Reference wavelength 940 nm

TABLE 4

Aspheric coefficient

| Surface | 2 | 3 | 4 | 5 | 6 |
|---|---|---|---|---|---|
| K: | −1.2236E+02 | 2.4920E−01 | −4.9821E+00 | −3.3359E+01 | 1.2311E+02 |
| A2: | 0.0000E+00 | 0.0000E+00 | 0.0000E+00 | 0.0000E+00 | 0.0000E+00 |
| A4: | 1.1115E−01 | 1.7422E−01 | 7.4947E−01 | 1.9800E−01 | −1.4475E−01 |
| A6: | −3.9531E−02 | 1.4716E−01 | −1.7598E+01 | −2.5903E+00 | 8.7301E−01 |
| A8: | 1.2239E−02 | −1.7434E−02 | 2.2591E+02 | 1.3910E+01 | −9.4262E+00 |
| A10: | −3.6601E−03 | −1.0591E−01 | −1.7473E+03 | −5.4311E+01 | 5.2390E+01 |
| A12: | 1.3042E−03 | 1.8871E−01 | 8.4145E+03 | 1.5808E+02 | −1.4285E+02 |
| A14: | −4.7423E−04 | −1.6217E−01 | −2.5472E+04 | −3.3104E+02 | 2.0795E+02 |
| A16: | 8.6096E−05 | 1.2690E−03 | 4.7113E+04 | 4.4178E+02 | −1.6174E+02 |
| A18: | −7.1120E−07 | 7.0272E−03 | −4.8658E+04 | −3.2701E+02 | 6.0729E+01 |
| A20: | −1.0737E−06 | 5.9703E−03 | 2.1509E+04 | 1.0189E+02 | −7.6991E+00 |

| Surface | 7 | 8 | 9 | 10 | 11 |
|---|---|---|---|---|---|
| K: | −1.0606E+01 | −4.8838E+00 | −2.2689E+01 | −5.0390E+00 | −2.8305E+00 |
| A2: | 0.0000E+00 | 0.0000E+00 | 0.0000E+00 | 0.0000E+00 | 0.0000E+00 |
| A4: | −3.3038E−01 | −3.6144E−01 | −8.7707E−01 | −1.0252E+00 | −4.3973E−01 |
| A6: | 1.4275E+00 | 3.7737E+00 | 4.5239E+00 | 5.7067E+00 | 6.0466E−01 |
| A8: | −1.2782E+01 | −2.5791E+01 | −1.0937E+01 | −2.3614E+01 | 7.2493E−01 |
| A10: | 3.8275E+01 | 8.6682E+01 | 1.0111E+01 | 6.7629E+01 | −5.6987E+00 |
| A12: | −2.1517E+01 | −1.6170E+02 | 1.0784E+01 | −1.3555E+02 | 1.1708E+01 |
| A14: | −1.0032E+02 | 1.7636E+02 | −3.8243E+01 | 1.8110E+02 | −1.2731E+01 |
| A16: | 2.2229E+02 | −1.1008E+02 | 4.0853E+01 | −1.5136E+02 | 7.9486E+00 |
| A18: | −1.8132E+02 | 3.5339E+01 | −1.9883E+01 | 7.0866E+01 | −2.7032E+00 |
| A20: | 5.4314E+01 | −4.2591E+00 | 3.6658E+00 | −1.4069E+01 | 3.9033E−01 |

In the second embodiment, an aspheric curve equation is expressed as that in the first embodiment. In addition, definitions of parameters in the following tables are the same as those in the first embodiment, and are not repeated herein.

Referring to Table 3 and Table 4, the following data may be calculated:

| Second embodiment | | | |
|---|---|---|---|
| IMH/EPD | 1.69 | SL/f | 2.84 |
| (CT2 + CT3)/(CT4 + CT5) | 0.94 | tan(HFOV)*f5/R10 | 7.49 |
| (CT2 + CT4)/CT3 | 4.10 | (TL-BFL)/IMH*f | 3.60(mm) |
| (f5*T45)/(T23 + T34) | 8.06(mm) | (TL-SL)/IMH | 1.43 |
| R1/(CT1 + T12) | −30.76 | f5*R10/SL | 1.91(mm) |
| CT4/(CT1 + CT3 + CT5) | 0.53 | (f5/f2)/(f/SL) | 8.49 |
| SL/IMH | 2.40 | f/IMH*(R1/R10) | −50.10 |
| TL/IMH | 3.83 | EPD*R5/(TL/IMH) | 15.48(mm*mm) |

Third Embodiment

Figure 3A:
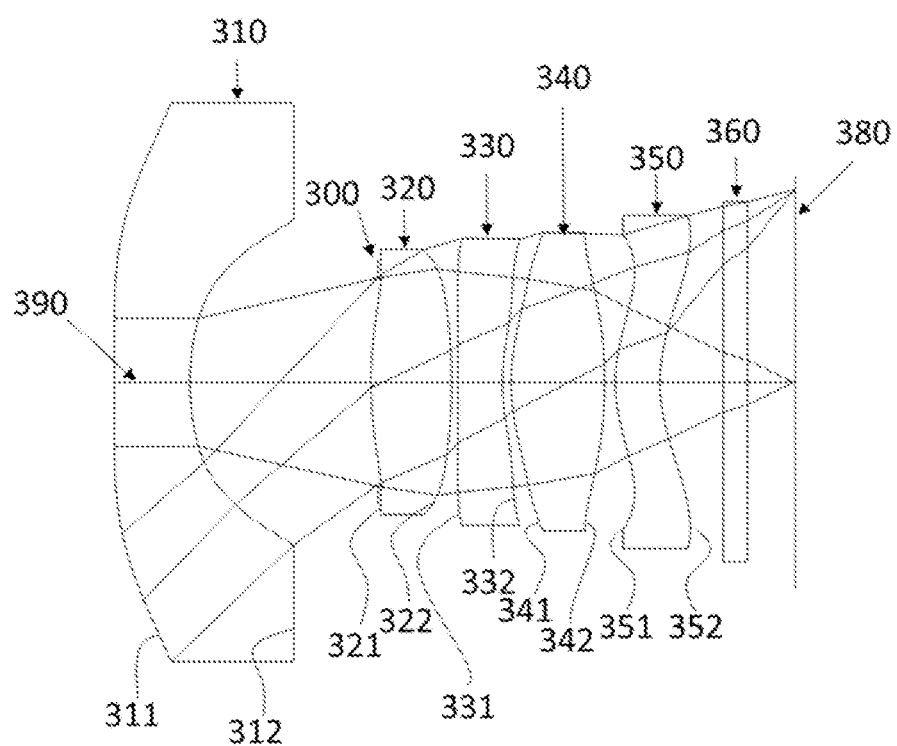
FIG. 3A is a schematic view of an optical lens assembly according to a third embodiment of the present disclosure.
Figure 3B:
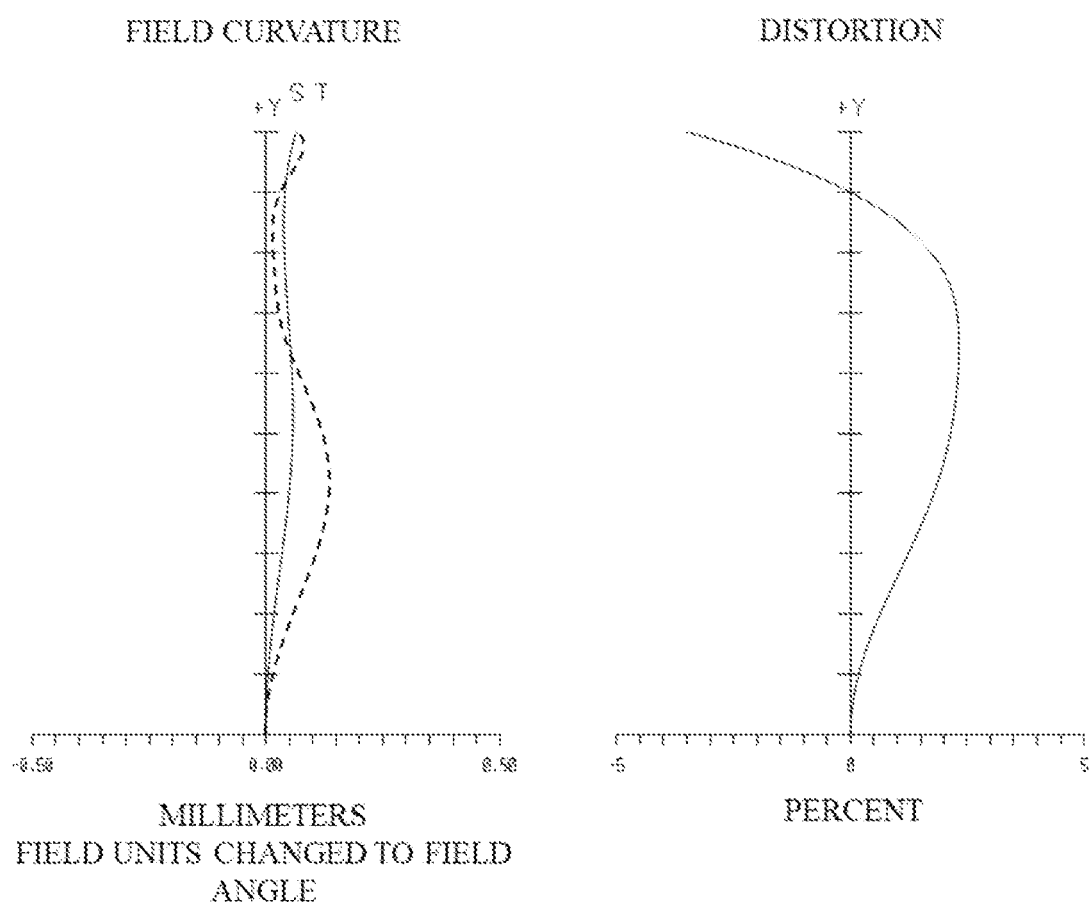
FIG. 3B shows a field curvature curves and a distortion curve of the optical lens assembly of the third embodiment.

Refer to FIG. 3A and FIG. 3B. FIG. 3A is a schematic view of an optical lens assembly according to a third embodiment of the present disclosure, and FIG. 3B shows a field curvature curve and a distortion curve of an optical lens assembly according to a second embodiment. As can be seen from FIG. 3A, the optical lens assembly includes, in order from an object side to an image side: a stop 300, a first lens 310, a second lens 320, a third lens 330, a fourth lens 340, a fifth lens 350, an IR bandpass filter 360, and an image plane 380. A total quantity of lenses with refractive power in the optical lens assembly is five, but not limited thereto.

The first lens 310 with negative refractive power is made of a plastic material and includes an object-side surface 311 and an image-side surface 312, wherein the object-side surface 311 of the first lens 310 is concave near an optical axis 390, and the image-side surface 312 of the first lens 310 is concave near the optical axis 390. The object-side surface 311 and the image-side surface 312 are aspheric.

The second lens 320 with positive refractive power is made of a plastic material and includes an object-side surface 321 and an image-side surface 322, wherein the object-side surface 321 of the second lens 320 is convex near the optical axis 390, and the image-side surface 322 of the second lens 320 is convex near the optical axis 390. The object-side surface 321 and the image-side surface 322 are aspheric.

The third lens 330 with negative refractive power is made of a plastic material and includes an object-side surface 331 and an image-side surface 332, wherein the object-side surface 331 of the third lens 330 is convex near an optical axis 390, and the image-side surface 332 of the third lens 330 is concave near the optical axis 390. The object-side surface 331 and the image-side surface 332 are aspheric.

The fourth lens 340 with positive refractive power is made of a plastic material and includes an object-side surface 341 and an image-side surface 342, wherein the object-side surface 341 of the fourth lens 340 is convex near an optical axis 390, and the image-side surface 342 of the fourth lens 340 is convex near the optical axis 390. The object-side surface 341 and the image-side surface 342 are aspheric.

The fifth lens 350 with positive refractive power is made of a plastic material and includes an object-side surface 351 and an image-side surface 352, wherein the object-side surface 351 of the fifth lens 350 is convex near the optical axis 390, and the image-side surface 352 of the fifth lens 350 is concave near the optical axis 390. The object-side surface 351 and the image-side surface 352 are aspheric.

The IR bandpass filter 360 is made of glass, and is disposed between the seventh lens 370 and the image plane 380 without affecting a focal length of the optical lens assembly. It can be understood that, the IR bandpass filter 360 may also be formed on the surface of the above-mentioned lens. The IR bandpass filter 360 may also be made of other materials.

Refer to Table 5 and Table 6 below.

TABLE 5

Third embodiment
f (focal length) = 1.18 mm (millimeters), Fno (f-number) = 1.24,
FOV (field of view) = 101.81 deg (degree).

| Surface # | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 200 | | | | |
| 1 | First lens | −18.429 (ASP) | 0.64 | Plastic | 1.54 | 55.99 | −2.91 |
| 2 | | 1.725 (ASP) | 1.58 | | | | |
| 3 | Stop | Infinity | −0.06 | | | | |
| 4 | Second lens | 2.575 (ASP) | 0.68 | Plastic | 1.64 | 22.47 | 2.34 |
| 5 | | −2.991 (ASP) | 0.05 | | | | |
| 6 | Third lens | 35.623 (ASP) | 0.38 | Plastic | 1.64 | 22.47 | −2.11 |
| 7 | | 1.257 (ASP) | 0.07 | | | | |
| 8 | Fourth lens | 1.315 (ASP) | 0.78 | Plastic | 1.64 | 22.47 | 1.68 |
| 9 | | −3.891 (ASP) | 0.10 | | | | |
| 10 | Fifth lens | 0.907 (ASP) | 0.38 | Plastic | 1.64 | 22.47 | 5.52 |
| 11 | | 1.037 (ASP) | 0.53 | | | | |
| 12 | IR bandpass filter | Infinity | 0.21 | Glass | 1.52 | 64.17 | |
| 13 | | Infinity | 0.40 | | | | |
| 14 | Image Plane | Infinity | — | | | | |

Reference wavelength 940 nm

TABLE 6

| | Aspheric coefficient | | | | |
|---|---|---|---|---|---|
| Surface | 2 | 3 | 4 | 5 | 6 |
| K: | −8.3187E+01 | 4.2894E−01 | −5.4180E+00 | −3.3871E+01 | 1.5444E+02 |
| A2: | 0.0000E+00 | 0.0000E+00 | 0.0000E+00 | 0.0000E+00 | 0.0000E+00 |
| A4: | 9.9970E−02 | 1.2620E−01 | 1.8151E−01 | −1.2545E−01 | −2.3810E−01 |
| A6: | −4.9556E−02 | 8.6667E−02 | −9.9422E−01 | 1.4936E+00 | 1.9306E+00 |
| A8: | 3.4546E−02 | −4.4355E−03 | −1.1529E+00 | −8.7107E+00 | −1.0076E+01 |
| A10: | −2.2037E−02 | −3.5714E−02 | 3.3627E+01 | 2.4798E+01 | 2.8884E+01 |
| A12: | 9.4336E−03 | 5.5566E−02 | −1.5437E+02 | −3.9826E+01 | −4.5502E+01 |
| A14: | −2.4513E−03 | −3.2198E−02 | 3.3068E+02 | 3.5894E+01 | 3.9563E+01 |
| A16: | 3.4672E−04 | −1.1117E−05 | −3.4938E+02 | −1.7042E+01 | −1.7773E+01 |
| A18: | −2.0424E−05 | −8.7472E−04 | 1.4642E+02 | 3.3586E+00 | 3.2156E+00 |
| A20: | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| K: | −1.0936E+01 | −4.6813E+00 | −1.5185E+01 | −4.9798E+00 | −2.5606E+00 |
| A2: | 0.0000E+00 | 0.0000E+00 | 0.0000E+00 | 0.0000E+00 | 0.0000E+00 |
| A4: | −1.1472E−01 | −1.7708E−01 | −6.1947E−01 | −4.4568E−01 | −1.9141E−01 |
| A6: | −4.7067E−01 | 1.0728E+00 | 2.5255E+00 | 1.8019E+00 | 6.0607E−01 |
| A8: | 1.3452E+00 | −4.5768E+00 | −5.3654E+00 | −4.5428E+00 | −1.7780E+00 |

TABLE 6-continued

| Aspheric coefficient | | | | | |
|---|---|---|---|---|---|
| A10: | −5.4151E+00 | 8.4490E+00 | 5.8618E+00 | 5.7056E+00 | 2.5965E+00 |
| A12: | 1.5909E+01 | −6.8832E+00 | −2.4891E+00 | −4.0953E+00 | −2.1785E+00 |
| A14: | −2.2106E+01 | 1.6349E+00 | −8.1239E−01 | 1.8037E+00 | 1.0893E+00 |
| A16: | 1.4252E+01 | 8.1809E−01 | 1.1670E+00 | −5.2789E−01 | −3.0734E−01 |
| A18: | −3.4879E+00 | −3.8850E−01 | −3.1838E−01 | 9.1094E−02 | 3.8063E−02 |
| A20: | 0.0000E+00 | 0.0000E+00 | 0.0000E+00 | 0.0000E+00 | 0.0000E+00 |

In the third embodiment, an aspheric curve equation is expressed as that in the first embodiment. In addition, definitions of parameters in the following tables are the same as those in the first embodiment, and are not repeated herein.

Referring to Table 5 and Table 6, the following data may be calculated:

| Third embodiment | | | |
|---|---|---|---|
| IMH/EPD | 1.48 | SL/f | 2.99 |
| (CT2 + CT3)/(CT4 + CT5) | 0.92 | tan(HFOV)*f5/R10 | 6.55 |
| (CT2 + CT4)/CT3 | 3.87 | (TL-BFL)/IMH*f | 3.86(mm) |
| (f5*T45)/(T23 + T34) | 4.42(mm) | (TL-SL)/IMH | 1.59 |
| R1/(CT1 + T12) | −8.53 | f5*R10/SL | 1.63(mm) |
| CT4/(CT1 + CT3 + CT5) | 0.56 | (f5/f2)/(f/SL) | 7.05 |
| SL/IMH | 2.51 | f/IMH*(R1/R10) | −14.92 |
| TL/IMH | 4.09 | EPD*R5/(TL/IMH) | 8.24(mm*mm) |

Fourth Embodiment

Figure 4A:
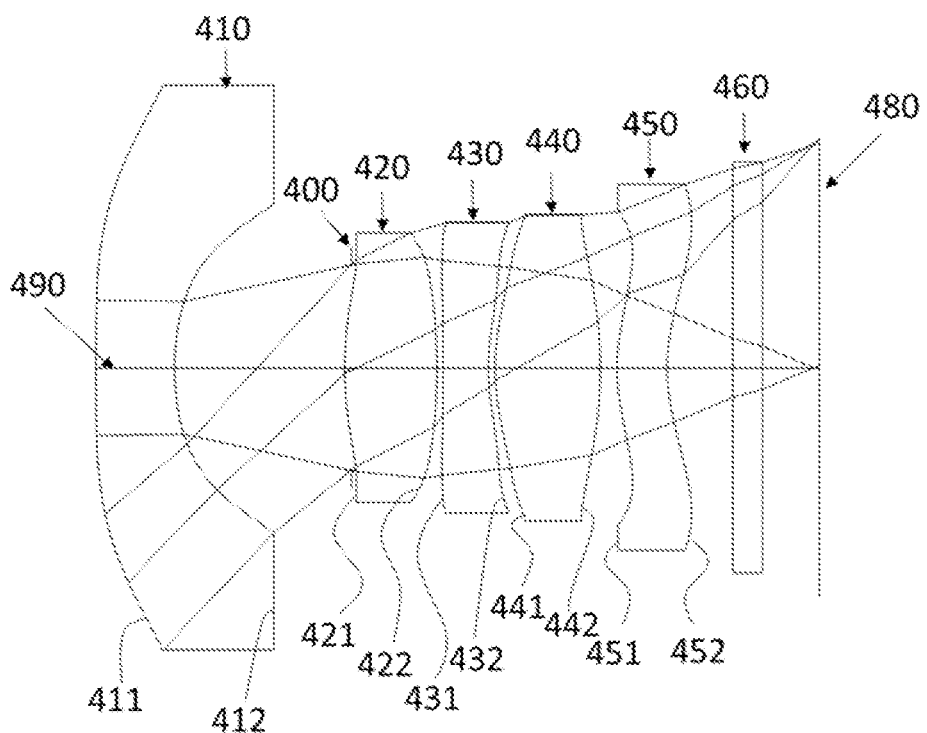
FIG. 4A is a schematic view of an optical lens assembly according to a fourth embodiment of the present disclosure.
Figure 4B:
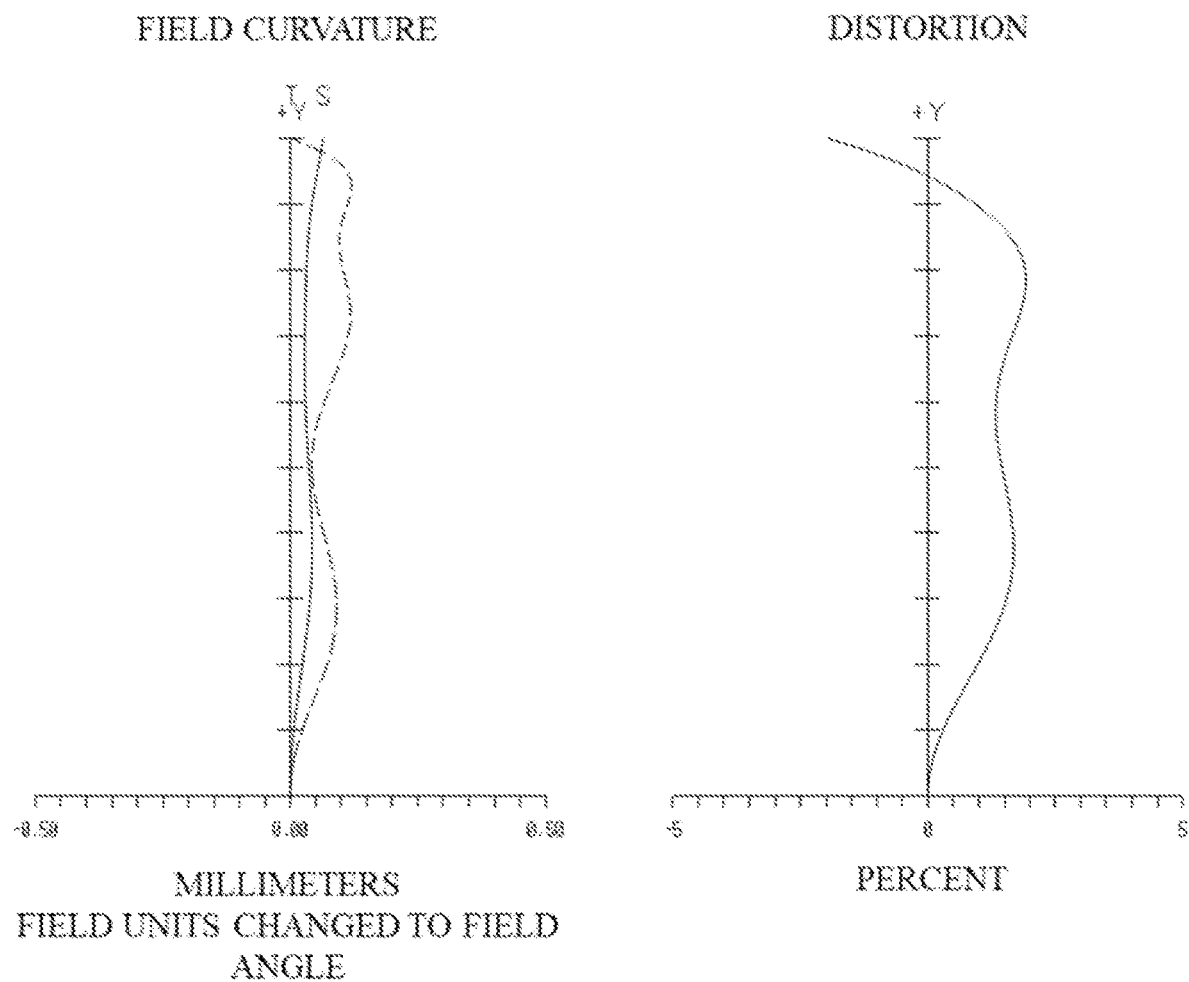
FIG. 4B shows a field curvature curves and a distortion curve of the optical lens assembly of the fourth embodiment.

Refer to FIG. 4A and FIG. 4B. FIG. 4A is a schematic view of an optical lens assembly according to a fourth embodiment of the present disclosure, and FIG. 4B shows a field curvature curve and a distortion curve of an optical lens assembly according to a second embodiment. As can be seen from FIG. 4A, the optical lens assembly includes, in order from an object side to an image side: a stop 400, a first lens 410, a second lens 420, a third lens 430, a fourth lens 440, a fifth lens 450, an IR bandpass filter 460, and an image plane 480. A total quantity of lenses with refractive power in the optical lens assembly is five, but not limited thereto.

The first lens 410 with negative refractive power is made of a plastic material and includes an object-side surface 411 and an image-side surface 412, wherein the object-side surface 411 of the first lens 410 is convex near an optical axis 490, and the image-side surface 412 of the first lens 410 is concave near the optical axis 490. The object-side surface 411 and the image-side surface 412 are aspheric.

The second lens 420 with positive refractive power is made of a plastic material and includes an object-side surface 421 and an image-side surface 422, wherein the object-side surface 421 of the second lens 420 is convex near the optical axis 490, and the image-side surface 422 of the second lens 420 is convex near the optical axis 490. The object-side surface 421 and the image-side surface 422 are aspheric.

The third lens 430 with negative refractive power is made of a plastic material and includes an object-side surface 431 and an image-side surface 432, wherein the object-side surface 431 of the third lens 430 is convex near an optical axis 490, and the image-side surface 432 of the third lens 430 is concave near the optical axis 490. The object-side surface 431 and the image-side surface 432 are aspheric.

The fourth lens 440 with negative refractive power is made of a plastic material and includes an object-side surface 441 and an image-side surface 442, wherein the object-side surface 441 of the fourth lens 440 is convex near an optical axis 490, and the image-side surface 442 of the fourth lens 440 is convex near the optical axis 490. The object-side surface 441 and the image-side surface 442 are aspheric.

The fifth lens 450 with positive refractive power is made of a plastic material and includes an object-side surface 451 and an image-side surface 452, wherein the object-side surface 451 of the fifth lens 450 is convex near the optical axis 490, and the image-side surface 452 of the fifth lens 450 is concave near the optical axis 490. The object-side surface 451 and the image-side surface 452 are aspheric.

The IR bandpass filter 460 is made of glass, and is disposed between the fifth lens 450 and the image plane 480 without affecting a focal length of the optical lens assembly. It can be understood that, the IR bandpass filter 460 may also be formed on the surface of the above-mentioned lens. The IR bandpass filter 460 may also be made of other materials.

Refer to Table 7 and Table 8 below.

TABLE 7

Fourth embodiment
f (focal length) = 1.19 mm (millimeters), Fno (f-number) = 1.43,
FOV (field of view) = 100.10 deg (degree).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 200 | | | | |
| 1 | First lens | 425.700 (ASP) | 0.55 | Plastic | 1.54 | 55.99 | −2.68 |
| 2 | | 1.430 (ASP) | 1.25 | | | | |
| 3 | Stop | Infinity | −0.04 | | | | |
| 4 | Second lens | 2.180 (ASP) | 0.65 | Plastic | 1.64 | 22.47 | 2.02 |
| 5 | | −2.620 (ASP) | 0.04 | | | | |
| 6 | Third lens | 79.706 (ASP) | 0.32 | Plastic | 1.64 | 22.47 | −1.79 |
| 7 | | 1.093 (ASP) | 0.05 | | | | |
| 8 | Fourth lens | 1.195 (ASP) | 0.74 | Plastic | 1.64 | 22.47 | 1.48 |
| 9 | | −3.049 (ASP) | 0.12 | | | | |
| 10 | Fifth lens | 0.891 (ASP) | 0.35 | Plastic | 1.64 | 22.47 | 6.37 |
| 11 | | 0.975 (ASP) | 0.47 | | | | |
| 12 | IR bandpass filter | Infinity | 0.21 | Glass | 1.52 | 64.17 | |
| 13 | | Infinity | 0.40 | | | | |
| 14 | Image Plane | Infinity | — | | | | |

Reference wavelength 940 nm

TABLE 8

Aspheric coefficient

| Surface | 2 | 3 | 4 | 5 | 6 |
|---|---|---|---|---|---|
| K: | 1.6831E+02 | 1.9922E−01 | −4.8595E+00 | −3.3572E+01 | 1.9094E+02 |
| A2: | 0.0000E+00 | 0.0000E+00 | 0.0000E+00 | 0.0000E+00 | 0.0000E+00 |
| A4: | 1.2834E−01 | 1.8391E−01 | 4.1218E−01 | 1.9897E−01 | −2.0392E−01 |
| A6: | −4.6217E−02 | 2.0656E−01 | −6.4338E+00 | −4.8521E+00 | −9.9212E−01 |
| A8: | 1.3488E−02 | −1.8397E−02 | 5.3989E+01 | 3.4571E+01 | 1.1851E+01 |
| A10: | −4.2095E−03 | −1.7857E−01 | −2.7626E+02 | −1.2927E+02 | −3.8652E+01 |
| A12: | 2.6432E−03 | 3.1188E−01 | 8.5928E+02 | 2.7145E+02 | 6.1083E+01 |
| A14: | −1.6380E−03 | −2.9356E−01 | −1.6002E+03 | −3.2973E+02 | −5.0697E+01 |
| A16: | 4.8066E−04 | 1.6477E−02 | 1.6210E+03 | 2.1655E+02 | 2.1124E+01 |
| A18: | −5.1134E−05 | 2.9165E−02 | −6.7663E+02 | −5.9003E+01 | −3.4337E+00 |
| A20: | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| K: | −1.0446E+01 | −4.8456E+00 | −2.3201E+01 | −5.0264E+00 | −2.8810E+00 |
| A2: | 0.0000E+00 | 0.0000E+00 | 0.0000E+00 | 0.0000E+00 | 0.0000E+00 |
| A4: | −3.7478E−01 | −2.3231E−01 | −7.6898E−01 | −9.5223E−01 | −4.9259E−01 |
| A6: | 9.9348E−01 | 1.3882E+00 | 3.4307E+00 | 4.6293E+00 | 9.9374E−01 |
| A8: | −1.0021E+01 | −1.0180E+01 | −5.3269E+00 | −1.5837E+01 | −1.0628E+00 |
| A10: | 4.4449E+01 | 3.3991E+01 | −6.6238E+00 | 3.4687E+01 | −8.0981E−01 |
| A12: | −9.2313E+01 | −5.7750E+01 | 3.8683E+01 | −5.1785E+01 | 3.1488E+00 |
| A14: | 1.0122E+02 | 5.2679E+01 | −6.1245E+01 | 4.9924E+01 | −3.1905E+00 |
| A16: | −5.6719E+01 | −2.3997E+01 | 4.4336E+01 | −2.7671E+01 | 1.4584E+00 |
| A18: | 1.2715E+01 | 4.0408E+00 | −1.2499E+01 | 6.6572E+00 | −2.5741E−01 |
| A20: | 0.0000E+00 | 0.0000E+00 | 0.0000E+00 | 0.0000E+00 | 0.0000E+00 |

In the Fourth embodiment, an aspheric curve equation is expressed as that in the first embodiment. In addition, definitions of parameters in the following tables are the same as those in the first embodiment, and are not repeated herein.

Referring to Table 7 and Table 8, the following data may be calculated:

| Fourth embodiment | | | |
|---|---|---|---|
| IMH/EPD | 1.68 | SL/f | 2.77 |
| (CT2 + CT3)/(CT4 + CT5) | 0.89 | tan(HFOV)*f5/R10 | 7.79 |
| (CT2 + CT4)/CT3 | 4.33 | (TL-BFL)/IMH*f | 3.43(mm) |
| (f5*T45)/(T23 + T34) | 8.30(mm) | (TL-SL)/IMH | 1.29 |

-continued

| Fourth embodiment | | | |
|---|---|---|---|
| R1/(CT1 + T12) | 242.16 | f5*R10/SL | 1.88(mm) |
| CT4/(CT1 + CT3 + CT5) | 0.60 | (f5/f2)/(f/SL) | 8.74 |
| SL/IMH | 2.36 | f/IMH*(R1/R10) | 371.57 |
| TL/IMH | 3.65 | EPD*R5/(TL/IMH) | 18.24(mm*mm) |

Fifth Embodiment

Figure 5A:
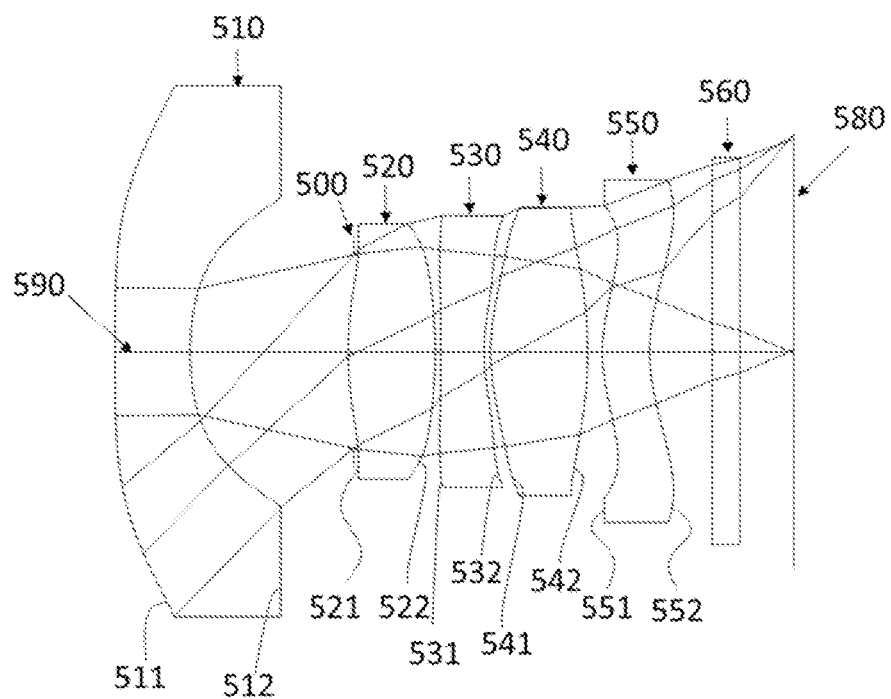
FIG. 5A is a schematic view of an optical lens assembly according to a fifth embodiment of the present disclosure.
Figure 5B:
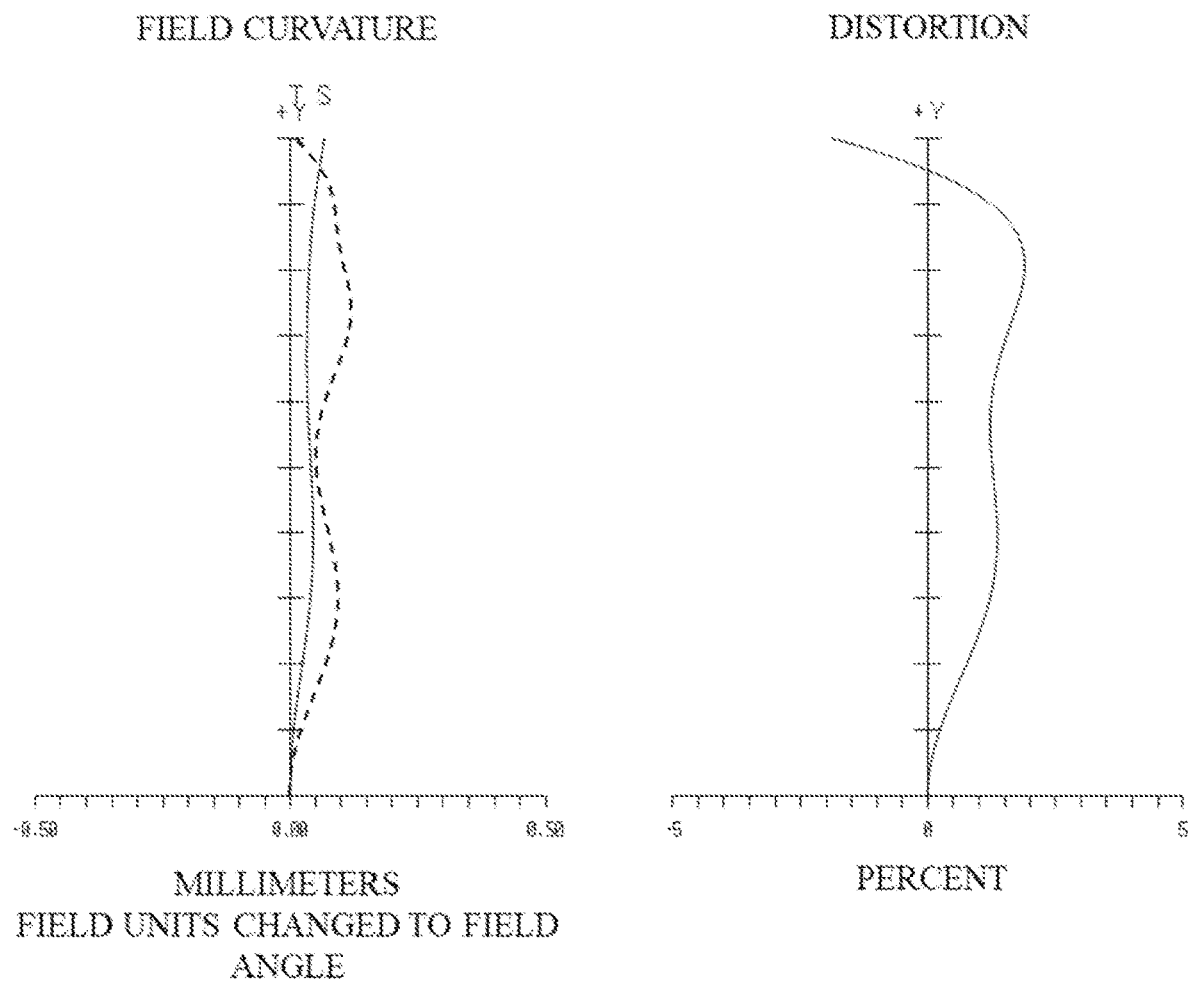
FIG. 5B shows a field curvature curves and a distortion curve of the optical lens assembly of the fifth embodiment.

Refer to FIG. 5A and FIG. 5B. FIG. 5A is a schematic view of an optical lens assembly according to a fifth embodiment of the present disclosure, and FIG. 5B shows a field curvature curve and a distortion curve of an optical lens assembly according to a second embodiment. As can be seen from FIG. 5A, the optical lens assembly includes, in order from an object side to an image side: a stop 500, a first lens 510, a second lens 520, a third lens 530, a fourth lens 540, a fifth lens 550, an IR bandpass filter 560, and an image plane 580. A total quantity of lenses with refractive power in the optical lens assembly is five, but not limited thereto.

The first lens 510 with negative refractive power is made of a plastic material and includes an object-side surface 511 and an image-side surface 512, wherein the object-side surface 511 of the first lens 510 is concave near an optical axis 590, and the image-side surface 512 of the first lens 510 is concave near the optical axis 590. The object-side surface 511 and the image-side surface 512 are aspheric.

The second lens 520 with positive refractive power is made of a plastic material and includes an object-side surface 521 and an image-side surface 522, wherein the object-side surface 521 of the second lens 520 is convex near the optical axis 590, and the image-side surface 522 of the second lens 520 is convex near the optical axis 590. The object-side surface 521 and the image-side surface 522 are aspheric.

The third lens 530 with negative refractive power is made of a plastic material and includes an object-side surface 531 and an image-side surface 532, wherein the object-side surface 531 of the third lens 530 is convex near an optical axis 590, and the image-side surface 532 of the third lens 530 is concave near the optical axis 590. The object-side surface 531 and the image-side surface 532 are aspheric.

The fourth lens 540 with positive refractive power is made of a plastic material and includes an object-side surface 541 and an image-side surface 542, wherein the object-side surface 541 of the fourth lens 540 is convex near an optical axis 590, and the image-side surface 542 of the fourth lens 540 is convex near the optical axis 590. The object-side surface 541 and the image-side surface 542 are aspheric.

The fifth lens 550 with positive refractive power is made of a plastic material and includes an object-side surface 551 and an image-side surface 552, wherein the object-side surface 551 of the fifth lens 550 is convex near the optical axis 590, and the image-side surface 552 of the fifth lens 550 is concave near the optical axis 590. The object-side surface 551 and the image-side surface 552 are aspheric.

The IR bandpass filter 560 is made of glass, and is disposed between the fifth lens 550 and the image plane 580 without affecting a focal length of the optical lens assembly. It can be understood that, the IR bandpass filter 560 may also be formed on the surface of the above-mentioned lens. The IR bandpass filter 560 may also be made of other materials.

Refer to Table 9 and Table 10 below.

TABLE 9

Fifth embodiment
f (focal length) = 1.19 mm (millimeters), Fno (f-number) = 1.43,
FOV (field of view) = 100.14 deg (degree).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 200 | | | | |
| 1 | First lens | −107.913 (ASP) | 0.56 | Plastic | 1.54 | 55.99 | −2.67 |
| 2 | | 1.451 (ASP) | 1.22 | | | | |
| 3 | Stop | Infinity | −0.04 | | | | |
| 4 | Second lens | 2.172 (ASP) | 0.65 | Plastic | 1.64 | 22.47 | 2.02 |
| 5 | | −2.640 (ASP) | 0.04 | | | | |
| 6 | Third lens | 74.320 (ASP) | 0.32 | Plastic | 1.64 | 22.47 | −1.79 |
| 7 | | 1.096 (ASP) | 0.05 | | | | |
| 8 | Fourth lens | 1.184 (ASP) | 0.73 | Plastic | 1.64 | 22.47 | 1.48 |
| 9 | | −3.110 (ASP) | 0.11 | | | | |
| 10 | Fifth lens | 0.877 (ASP) | 0.35 | Plastic | 1.64 | 22.47 | 6.35 |
| 11 | | 0.956 (ASP) | 0.47 | | | | |
| 12 | IR bandpass filter | Infinity | 0.21 | Glass | 1.52 | 64.17 | |
| 13 | | Infinity | 0.40 | | | | |
| 14 | Image Plane | Infinity | — | | | | |

Reference wavelength 940 nm

TABLE 10

| | Aspheric coefficient | | | | |
|---|---|---|---|---|---|
| Surface | 2 | 3 | 4 | 5 | 6 |
| K: | 1.5874E+02 | 2.0176E−01 | −4.9911E+00 | −3.3056E+01 | 1.5600E+02 |
| A2: | 0.0000E+00 | 0.0000E+00 | 0.0000E+00 | 0.0000E+00 | 0.0000E+00 |
| A4: | 1.1837E−01 | 1.7684E−01 | 4.7340E−01 | 1.9910E−01 | −1.7939E−01 |
| A6: | −1.8183E−02 | 2.1018E−01 | −8.2791E+00 | −5.1947E+00 | −1.4444E+00 |
| A8: | −3.4735E−02 | −1.2304E−02 | 7.6871E+01 | 3.8158E+01 | 1.5982E+01 |
| A10: | 4.5713E−02 | −1.7612E−01 | −4.2287E+02 | −1.4767E+02 | −5.7929E+01 |
| A12: | −2.8171E−02 | 3.1129E−01 | 1.3756E+03 | 3.2276E+02 | 1.1073E+02 |
| A14: | 9.4179E−03 | −2.9583E−01 | −2.5993E+03 | −4.0879E+02 | −1.2207E+02 |
| A16: | −1.6392E−03 | 1.3760E−02 | 2.5986E+03 | 2.7928E+02 | 7.4636E+01 |
| A18: | 1.1622E−04 | 2.7267E−02 | −1.0442E+03 | −7.9075E+01 | −1.9701E+01 |
| A20: | 0.0000E+00 | 0.0000E+00 | 0.0000E+00 | 0.0000E+00 | 0.0000E+00 |
| Surface | 7 | 8 | 9 | 10 | 11 |
| K: | −1.0603E+01 | −4.7657E+00 | −2.1817E+01 | −5.2876E+00 | −2.9865E+00 |
| A2: | 0.0000E+00 | 0.0000E+00 | 0.0000E+00 | 0.0000E+00 | 0.0000E+00 |
| A4: | −3.1426E−01 | −1.5493E−01 | −8.2768E−01 | −1.0185E+00 | −5.9292E−01 |
| A6: | 1.3363E−01 | 3.4306E−01 | 4.3430E+00 | 5.3552E+00 | 2.1277E+00 |
| A8: | −5.6970E+00 | −4.7001E+00 | −1.0894E+01 | −1.8450E+01 | −5.6767E+00 |
| A10: | 3.6007E+01 | 1.9322E+01 | 1.1577E+01 | 3.8283E+01 | 9.0323E+00 |
| A12: | −9.1164E+01 | −3.5812E+01 | 3.8738E+00 | −5.1824E+01 | −8.9123E+00 |
| A14: | 1.1980E+02 | 3.4227E+01 | −2.1974E+01 | 4.4912E+01 | 5.3570E+00 |
| A16: | −8.1089E+01 | −1.5909E+01 | 2.0080E+01 | −2.2818E+01 | −1.8002E+00 |
| A18: | 2.2382E+01 | 2.6339E+00 | −6.1866E+00 | 5.2057E+00 | 2.6025E−01 |
| A20: | 0.0000E+00 | 0.0000E+00 | 0.0000E+00 | 0.0000E+00 | 0.0000E+00 |

In the Fifth embodiment, an aspheric curve equation is expressed as that in the first embodiment. In addition, definitions of parameters in the following tables are the same as those in the first embodiment, and are not repeated herein.

Referring to Table 9 and Table 10, the following data may be calculated:

| Fifth embodiment | | | |
|---|---|---|---|
| IMH/EPD | 1.68 | SL/f | 2.75 |
| (CT2 + CT3)/(CT4 + CT5) | 0.90 | tan(HFOV)*f5/R10 | 7.93 |
| (CT2 + CT4)/CT3 | 4.28 | (TL−BFL)/IMH*f | 3.39(mm) |
| (f5*T45)/(T23 + T34) | 7.75(mm) | (TL−SL)/IMH | 1.27 |
| R1/(CT1 + T12) | −62.08 | f5*R10/SL | 1.85(mm) |
| CT4/(CT1 + CT3 + CT5) | 0.59 | (f5/f2)/(f/SL) | 8.65 |
| SL/IMH | 2.34 | f/IMH*(R1/R10) | −95.98 |
| TL/IMH | 3.61 | EPD*R5/(TL/IMH) | 17.17(mm*mm) |

Sixth Embodiment

Figure 6A:
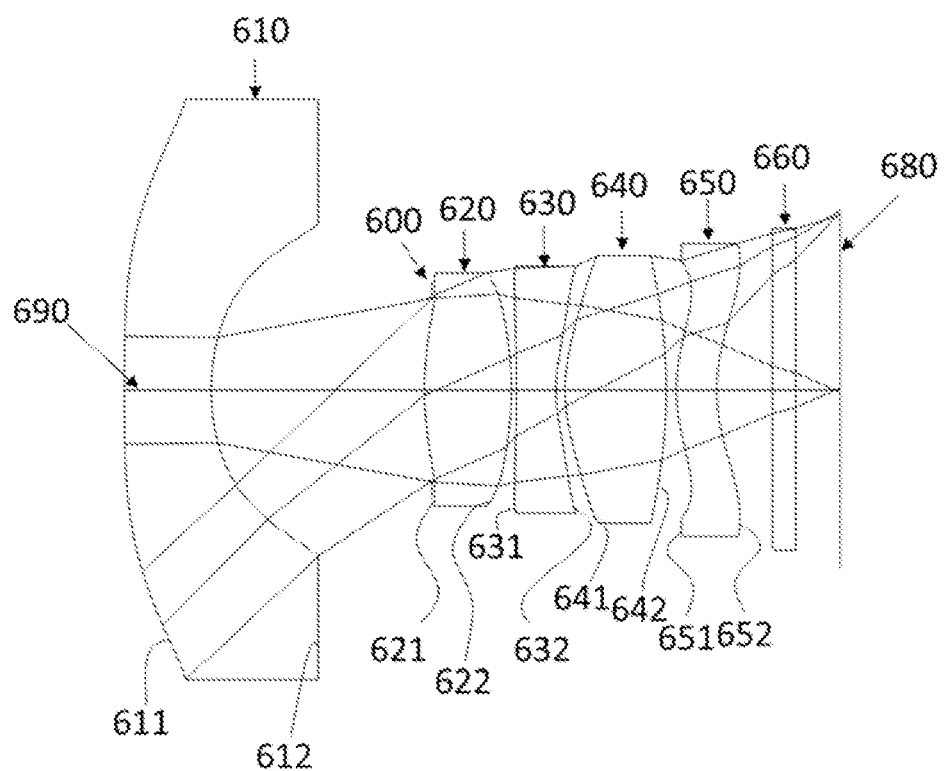
FIG. 6A is a schematic view of an optical lens assembly according to a sixth embodiment of the present disclosure.
Figure 6B:
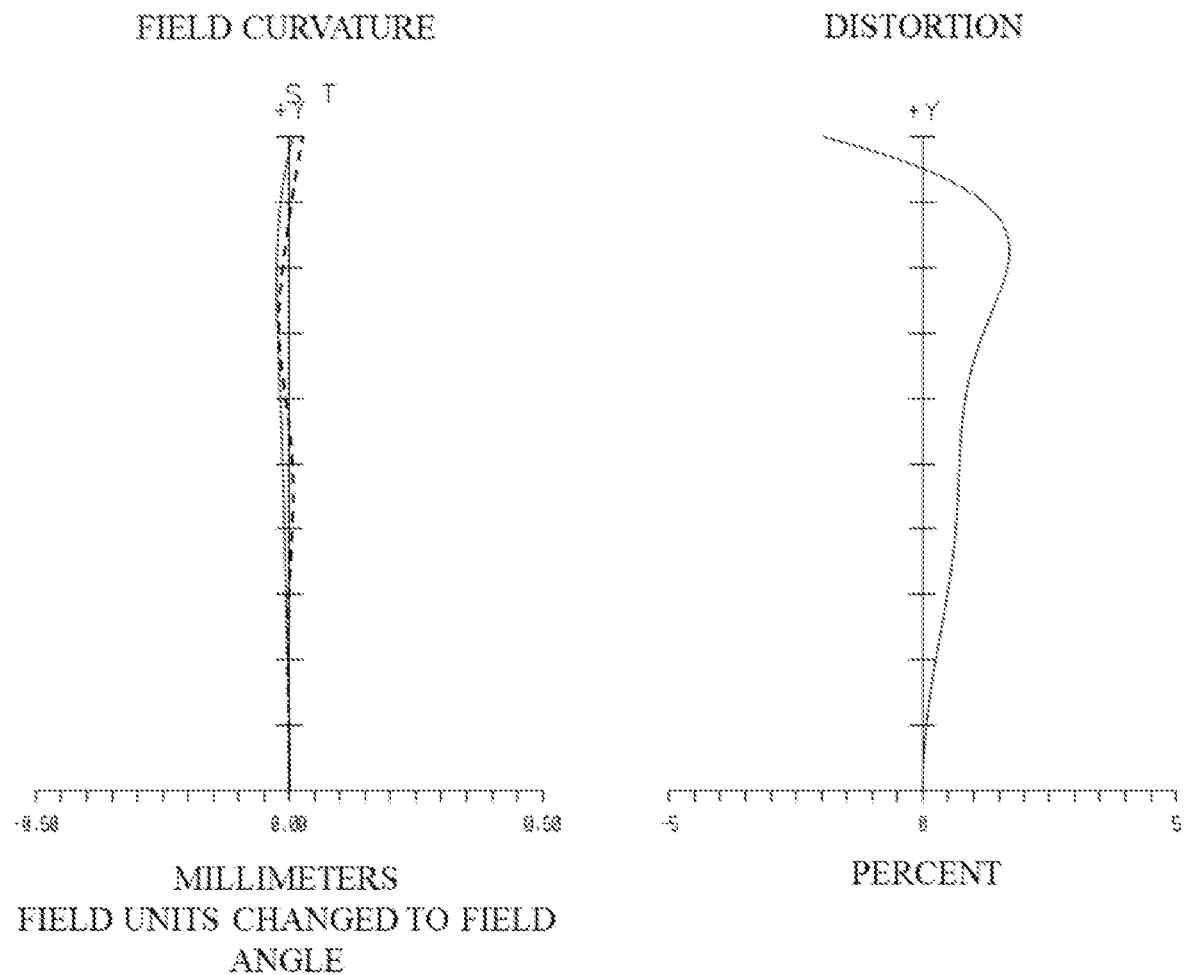
FIG. 6B shows a field curvature curves and a distortion curve of the optical lens assembly of the sixth embodiment.

Refer to FIG. 6A and FIG. 6B. FIG. 6A is a schematic view of an optical lens assembly according to a sixth embodiment of the present disclosure, and FIG. 6B shows a field curvature curve and a distortion curve of an optical lens assembly according to a second embodiment. As can be seen from FIG. 6A, the optical lens assembly includes, in order from an object side to an image side: a stop 600, a first lens 610, a second lens 620, a third lens 630, a fourth lens 640, a fifth lens 650, an IR bandpass filter 660, and an image plane 680. A total quantity of lenses with refractive power in the optical lens assembly is five, but not limited thereto.

The first lens 610 with negative refractive power is made of a plastic material and includes an object-side surface 611 and an image-side surface 612, wherein the object-side surface 611 of the first lens 610 is convex near an optical axis 690, and the image-side surface 612 of the first lens 610 is concave near the optical axis 690. The object-side surface 611 and the image-side surface 612 are aspheric.

The second lens 620 with positive refractive power is made of a plastic material and includes an object-side surface 621 and an image-side surface 622, wherein the object-side surface 621 of the second lens 620 is convex near the optical axis 690, and the image-side surface 622 of the second lens 620 is convex near the optical axis 690. The object-side surface 621 and the image-side surface 622 are aspheric.

The third lens 630 with negative refractive power is made of a plastic material and includes an object-side surface 631 and an image-side surface 632, wherein the object-side surface 631 of the third lens 630 is concave near an optical axis 690, and the image-side surface 632 of the third lens 630 is concave near the optical axis 690. The object-side surface 631 and the image-side surface 632 are aspheric.

The fourth lens 640 with positive refractive power is made of a plastic material and includes an object-side surface 641 and an image-side surface 642, wherein the object-side surface 641 of the fourth lens 640 is convex near an optical axis 690, and the image-side surface 642 of the fourth lens 640 is convex near the optical axis 690. The object-side surface 641 and the image-side surface 642 are aspheric.

The fifth lens 650 with positive refractive power is made of a plastic material and includes an object-side surface 651 and an image-side surface 652, wherein the object-side surface 651 of the fifth lens 650 is convex near the optical axis 690, and the image-side surface 652 of the fifth lens 650 is concave near the optical axis 690. The object-side surface 651 and the image-side surface 652 are aspheric.

The IR bandpass filter 660 is made of glass, and is disposed between the fifth lens 650 and the image plane 680 without affecting a focal length of the optical lens assembly. It can be understood that, the IR bandpass filter 660 may also be formed on the surface of the above-mentioned lens. The IR bandpass filter 660 may also be made of other materials.

Refer to Table 11 and Table 12 below.

TABLE 11

Sixth embodiment
f (focal length) = 1.20 mm (millimeters), Fno (f-number) = 1.42,
FOV (field of view) = 99.96 deg (degree).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 350 | | | | |
| 1 | First lens | 24.213 (ASP) | 0.78 | Plastic | 1.54 | 55.99 | −2.95 |
| 2 | | 1.465 (ASP) | 1.98 | | | | |
| 3 | Stop | Infinity | −0.06 | | | | |
| 4 | Second lens | 2.283 (ASP) | 0.78 | Plastic | 1.64 | 22.47 | 1.99 |
| 5 | | −2.334 (ASP) | 0.05 | | | | |
| 6 | Third lens | −182.280 (ASP) | 0.36 | Plastic | 1.64 | 22.47 | −1.66 |
| 7 | | 1.037 (ASP) | 0.08 | | | | |
| 8 | Fourth lens | 1.121 (ASP) | 0.90 | Plastic | 1.64 | 22.47 | 1.54 |
| 9 | | −4.497 (ASP) | 0.10 | | | | |
| 10 | Fifth lens | 1.084 (ASP) | 0.35 | Plastic | 1.64 | 22.47 | 9.73 |
| 11 | | 1.155 (ASP) | 0.50 | | | | |
| 12 | IR bandpass filter | Infinity | 0.21 | Glass | 1.52 | 64.17 | |
| 13 | | Infinity | 0.40 | | | | |
| 14 | Image Plane | Infinity | — | | | | |

Reference wavelength 940 nm

TABLE 12

Aspheric coefficient

| Surface | 2 | 3 | 4 | 5 | 6 |
|---|---|---|---|---|---|
| K: | 7.4011E+01 | −1.1038E+00 | −4.2214E+00 | −3.5307E+01 | −1.5014E+02 |
| A2: | 0.0000E+00 | 0.0000E+00 | 0.0000E+00 | 0.0000E+00 | 0.0000E+00 |
| A4: | 3.9275E−02 | 7.1367E−02 | 5.6875E−05 | −3.5194E−01 | −5.2713E−01 |
| A6: | −3.3196E−03 | 1.4150E−01 | −2.4833E−01 | 1.3666E+00 | 2.5469E+00 |
| A8: | −2.6937E−03 | −2.6567E−02 | 2.1407E+00 | −3.1662E+00 | −6.0248E+00 |
| A10: | 1.4953E−03 | −1.9511E−01 | −1.2168E+01 | 4.2023E+00 | 9.2867E+00 |
| A12: | −3.8009E−04 | 2.9275E−01 | 3.4943E+01 | −4.5253E+00 | −1.0254E+01 |
| A14: | 4.8368E−05 | −1.6316E−01 | −5.0456E+01 | 3.4195E+00 | 7.0792E+00 |
| A16: | −2.5239E−06 | 3.0551E−02 | 2.8525E+01 | −1.1236E+00 | −2.1044E+00 |
| A18: | 0.0000E+00 | 0.0000E+00 | −6.9000E−09 | 6.7141E−06 | −5.5438E−06 |
| A20: | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| K: | −9.2553E+00 | −4.5336E+00 | −2.7955E+01 | −4.3716E+00 | −1.9783E+00 |
| A2: | 0.0000E+00 | 0.0000E+00 | 0.0000E+00 | 0.0000E+00 | 0.0000E+00 |
| A4: | −3.6983E−01 | −1.7878E−01 | −2.8337E−01 | −2.6729E−01 | −1.4700E−01 |
| A6: | 7.7087E−01 | 4.9661E−01 | 1.2502E+00 | 6.7623E−01 | 1.0515E−02 |
| A8: | −1.1248E+00 | −1.1706E+00 | −3.2559E+00 | −1.9566E+00 | −1.5699E−01 |
| A10: | 1.5373E+00 | 2.0021E+00 | 5.1328E+00 | 2.5393E+00 | 2.8845E−01 |
| A12: | −1.7630E+00 | −2.1928E+00 | −4.8742E+00 | −1.8262E+00 | −2.4300E−01 |
| A14: | 1.2593E+00 | 1.3662E+00 | 2.5630E+00 | 6.6985E−01 | 1.0171E−01 |
| A16: | −3.5399E−01 | −3.5574E−01 | −5.6865E−01 | −9.7431E−02 | −1.7199E−02 |
| A18: | 5.9640E−07 | −1.2210E−07 | 1.3230E−07 | 0.0000E+00 | 0.0000E+00 |
| A20: | 0.0000E+00 | 0.0000E+00 | 0.0000E+00 | 0.0000E+00 | 0.0000E+00 |

In the sixth embodiment, an aspheric curve equation is expressed as that in the first embodiment. In addition, definitions of parameters in the following tables are the same as those in the first embodiment, and are not repeated herein.

Referring to Table 11 and Table 12, the following data may be calculated:

| Sixth embodiment | | | |
|---|---|---|---|
| IMH/EPD | 1.66 | SL/f | 3.06 |
| (CT2 + CT3)/(CT4 + CT5) | 0.90 | tan(HFOV)*f5/R10 | 10.03 |
| (CT2 + CT4)/CT3 | 4.73 | (TL-BFL)/IMH*f | 4.54(mm) |
| (f5*T45)/(T23 + T34) | 7.53(mm) | (TL-SL)/IMH | 1.97 |
| R1/(CT1 + T12) | 9.00 | f5*R10/SL | 3.07(mm) |
| CT4/(CT1 + CT3 + CT5) | 0.61 | (f5/f2)/(f/SL) | 14.98 |
| SL/IMH | 2.62 | f/IMH*(R1/R10) | 17.93 |
| TL/IMH | 4.58 | EPD*R5/(TL/IMH) | −33.60(mm*mm) |

Seventh Embodiment

Figure 7A:
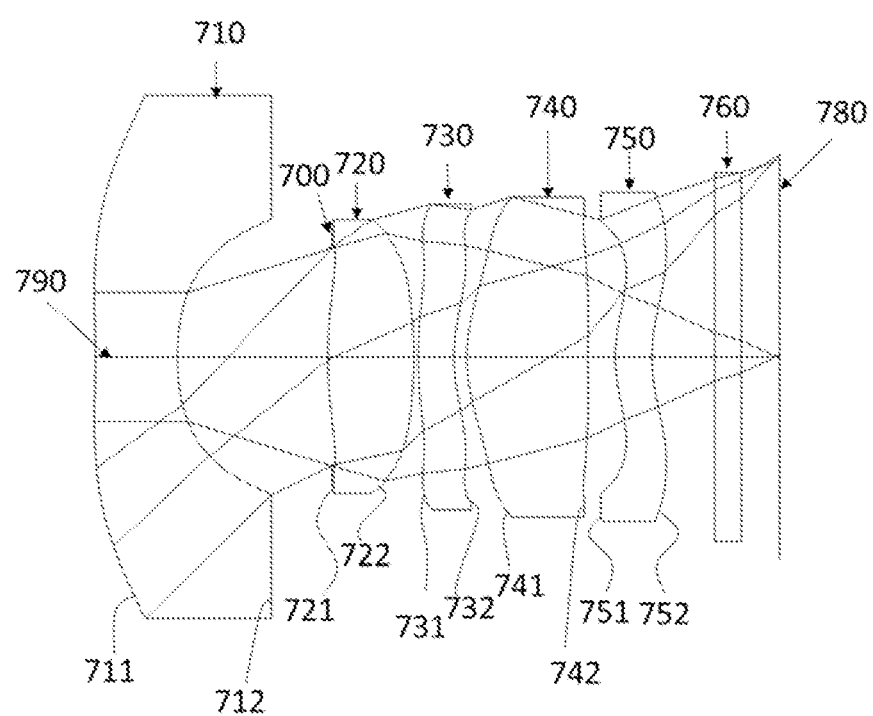
FIG. 7A is a schematic view of an optical lens assembly according to a seventh embodiment of the present disclosure.
Figure 7B:
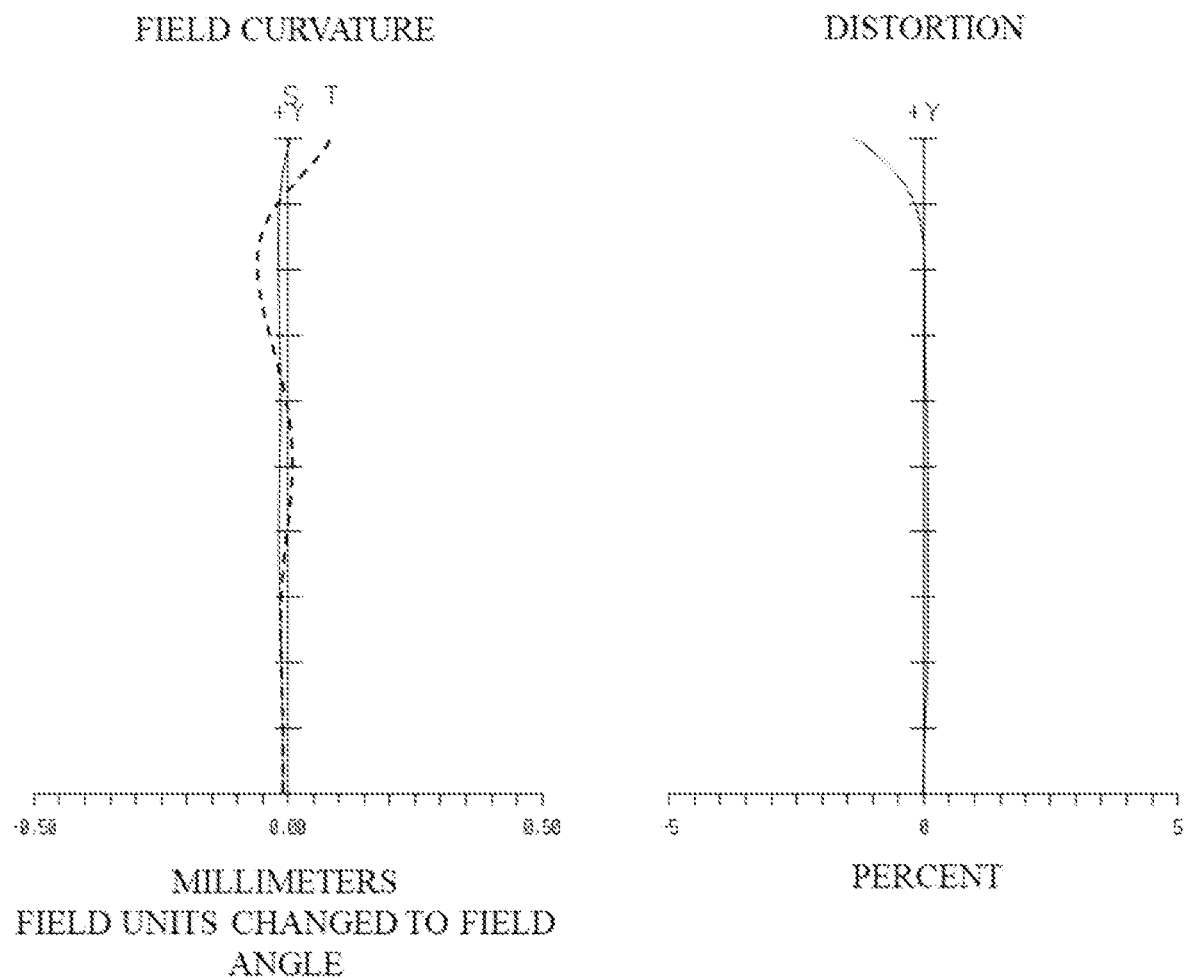
FIG. 7B shows a field curvature curves and a distortion curve of the optical lens assembly of the seventh embodiment.

Refer to FIG. 7A and FIG. 7B. FIG. 7A is a schematic view of an optical lens assembly according to a seventh embodiment of the present disclosure, and FIG. 7B shows a field curvature curve and a distortion curve of an optical lens assembly according to a second embodiment. As can be seen from FIG. 7A, the optical lens assembly includes, in order from an object side to an image side: a stop 700, a first lens 710, a second lens 720, a third lens 730, a fourth lens 740, a fifth lens 750, an IR bandpass filter 760, and an image plane 780. A total quantity of lenses with refractive power in the optical lens assembly is five, but not limited thereto.

The first lens 710 with negative refractive power is made of a plastic material and includes an object-side surface 711 and an image-side surface 712, wherein the object-side surface 711 of the first lens 710 is concave near an optical axis 790, and the image-side surface 712 of the first lens 710 is concave near the optical axis 790. The object-side surface 711 and the image-side surface 712 are aspheric.

The second lens 720 with positive refractive power is made of a plastic material and includes an object-side surface 721 and an image-side surface 722, wherein the object-side surface 721 of the second lens 720 is convex near the optical axis 790, and the image-side surface 722 of the second lens 720 is convex near the optical axis 790. The object-side surface 721 and the image-side surface 722 are aspheric.

The third lens 730 with negative refractive power is made of a plastic material and includes an object-side surface 731 and an image-side surface 732, wherein the object-side surface 731 of the third lens 730 is convex near an optical axis 790, and the image-side surface 732 of the third lens 730 is concave near the optical axis 790. The object-side surface 731 and the image-side surface 732 are aspheric.

The fourth lens 740 with positive refractive power is made of a plastic material and includes an object-side surface 741 and an image-side surface 742, wherein the object-side surface 741 of the fourth lens 740 is convex near an optical axis 790, and the image-side surface 742 of the fourth lens 740 is concave near the optical axis 790. The object-side surface 741 and the image-side surface 742 are aspheric.

The fifth lens 750 with positive refractive power is made of a plastic material and includes an object-side surface 751 and an image-side surface 752, wherein the object-side surface 751 of the fifth lens 750 is convex near the optical axis 790, and the image-side surface 752 of the fifth lens 750 is concave near the optical axis 790. The object-side surface 751 and the image-side surface 752 are aspheric.

The IR bandpass filter 760 is made of glass, and is disposed between the fifth lens 750 and the image plane 780 without affecting a focal length of the optical lens assembly. It can be understood that, the IR bandpass filter 760 may also be formed on the surface of the above-mentioned lens. The IR bandpass filter 760 may also be made of other materials.

Refer to Table 13 and Table 14 below.

TABLE 13

Seventh embodiment
f (focal length) = 1.21 mm (millimeters), Fno (f-number) = 1.35,
FOV (field of view) = 98.56 deg (degree).

| Surface | | Curvature radius (mm) | Central thickness/gap (mm) | Material | Refractive index (nd) | Abbe number (vd) | Focal length (mm) |
|---|---|---|---|---|---|---|---|
| 0 | Object | Infinity | 200 | | | | |
| 1 | First lens | −7.570 (ASP) | 0.65 | Plastic | 1.54 | 55.99 | −2.29 |
| 2 | | 1.508 (ASP) | 1.22 | | | | |
| 3 | Stop | Infinity | −0.03 | | | | |
| 4 | Second lens | 3.053 (ASP) | 0.68 | Plastic | 1.64 | 22.47 | 2.18 |
| 5 | | −2.218 (ASP) | 0.04 | | | | |
| 6 | Third lens | 3.491 (ASP) | 0.28 | Plastic | 1.64 | 22.47 | −2.08 |
| 7 | | 0.914 (ASP) | 0.10 | | | | |
| 8 | Fourth lens | 0.878 (ASP) | 0.97 | Plastic | 1.64 | 22.47 | 1.53 |
| 9 | | 6.725 (ASP) | 0.22 | | | | |
| 10 | Fifth lens | 0.889 (ASP) | 0.29 | Plastic | 1.64 | 22.47 | 5.33 |
| 11 | | 1.062 (ASP) | 0.50 | | | | |
| 12 | IR bandpass filter | Infinity | 0.21 | Glass | 1.52 | 64.17 | |
| 13 | | Infinity | 0.30 | | | | |
| 14 | Image Plane | Infinity | — | | | | |

Reference wavelength 940 nm

TABLE 14

| Aspheric coefficient | | | | | |
|---|---|---|---|---|---|
| Surface | 2 | 3 | 4 | 5 | 6 |
| K: | −8.8796E+01 | −8.5812E−01 | −3.1036E+00 | −2.4844E+01 | −9.3553E+01 |
| A2: | 0.0000E+00 | 0.0000E+00 | 0.0000E+00 | 0.0000E+00 | 0.0000E+00 |
| A4: | 1.7441E−01 | 3.6032E−01 | −9.2995E−02 | 6.5565E−01 | 7.9948E−01 |
| A6: | −1.2439E−01 | 3.1389E−01 | 1.6402E+00 | −5.2274E+00 | −4.0333E+00 |
| A8: | 5.9045E−02 | 6.5282E−01 | −1.6408E+01 | 1.8076E+01 | 1.0057E+01 |
| A10: | −2.7374E−03 | −1.2948E+01 | 8.4921E+01 | −4.6000E+01 | −2.1126E+01 |
| A12: | −1.5929E−02 | 5.5537E+01 | −2.6362E+02 | 8.5855E+01 | 3.5811E+01 |
| A14: | 1.0243E−02 | −1.1592E+02 | 4.8639E+02 | −1.1141E+02 | −4.0280E+01 |
| A16: | −3.0541E−03 | 1.3174E+02 | −5.0477E+02 | 9.3695E+01 | 2.7149E+01 |
| A18: | 4.6013E−04 | −7.7516E+01 | 2.5049E+02 | −4.5762E+01 | −9.8443E+00 |
| A20: | −2.8254E−05 | 1.8277E+01 | −3.4970E+01 | 9.8358E+00 | 1.4579E+00 |
| Surface | 7 | 8 | 9 | 10 | 11 |
| K: | −9.9165E+00 | −5.7916E+00 | −3.1097E+01 | −7.4305E+00 | −4.5924E+00 |
| A2: | 0.0000E+00 | 0.0000E+00 | 0.0000E+00 | 0.0000E+00 | 0.0000E+00 |
| A4: | −4.4737E−01 | −2.9431E−01 | −6.6519E−01 | 8.6253E+00 | −8.2939E−02 |
| A6: | 3.3642E+00 | 2.2180E+00 | 2.6332E+00 | −3.0938E+00 | −1.6462E+00 |
| A8: | −1.8318E+01 | −8.9325E+00 | −8.4844E+00 | 1.0096E+01 | 6.2136E+00 |
| A10: | 5.0681E+01 | 1.8655E+01 | 2.2410E+01 | −2.0398E+01 | −1.4361E+01 |
| A12: | −8.5082E+01 | −2.3174E+01 | −4.5454E+01 | 2.1007E+01 | 2.2090E+01 |
| A14: | 9.2788E+01 | 1.8510E+01 | 6.3756E+01 | −2.5760E+00 | −2.1988E+01 |
| A16: | −6.4434E+01 | −9.4606E+00 | −5.5938E+01 | −1.4969E+01 | 1.3502E+01 |
| A18: | 2.5980E+01 | 2.8056E+00 | 2.7168E+01 | 1.2098E+01 | −4.6491E+00 |
| A20: | −4.6539E+00 | −3.6062E−01 | −5.5063E+00 | −2.7046E+00 | 6.8836E−01 |

In the Seventh embodiment, an aspheric curve equation is expressed as that in the first embodiment. In addition, definitions of parameters in the following tables are the same as those in the first embodiment, and are not repeated herein.

Referring to Table 13 and Table 14, the following data may be calculated:

| Seventh embodiment | | | |
|---|---|---|---|
| IMH/EPD | 1.56 | SL/f | 2.93 |
| (CT2 + CT3)/(CT4 + CT5) | 0.76 | tan(HFOV)*f5/R10 | 5.83 |
| (CT2 + CT4)/CT3 | 5.87 | (TL-BFL)/IMH*f | 3.84 (mm) |
| (f5*T45)/(T23 + T34) | 8.45 (mm) | (TL-SL)/IMH | 1.34 |
| R1/(CT1 + T12) | −4.09 | f5*R10/SL | 1.59 (mm) |
| CT4/(CT1 + CT3 + CT5) | 0.79 | (f5/f2)/(f/SL) | 7.18 |
| SL/IMH | 2.54 | f/IMH*(R1/R10) | −6.18 |
| TL/IMH | 3.89 | EPD*R5/(TL/IMH) | 0.81 (mm*mm) |

Eighth Embodiment

Figure 8:
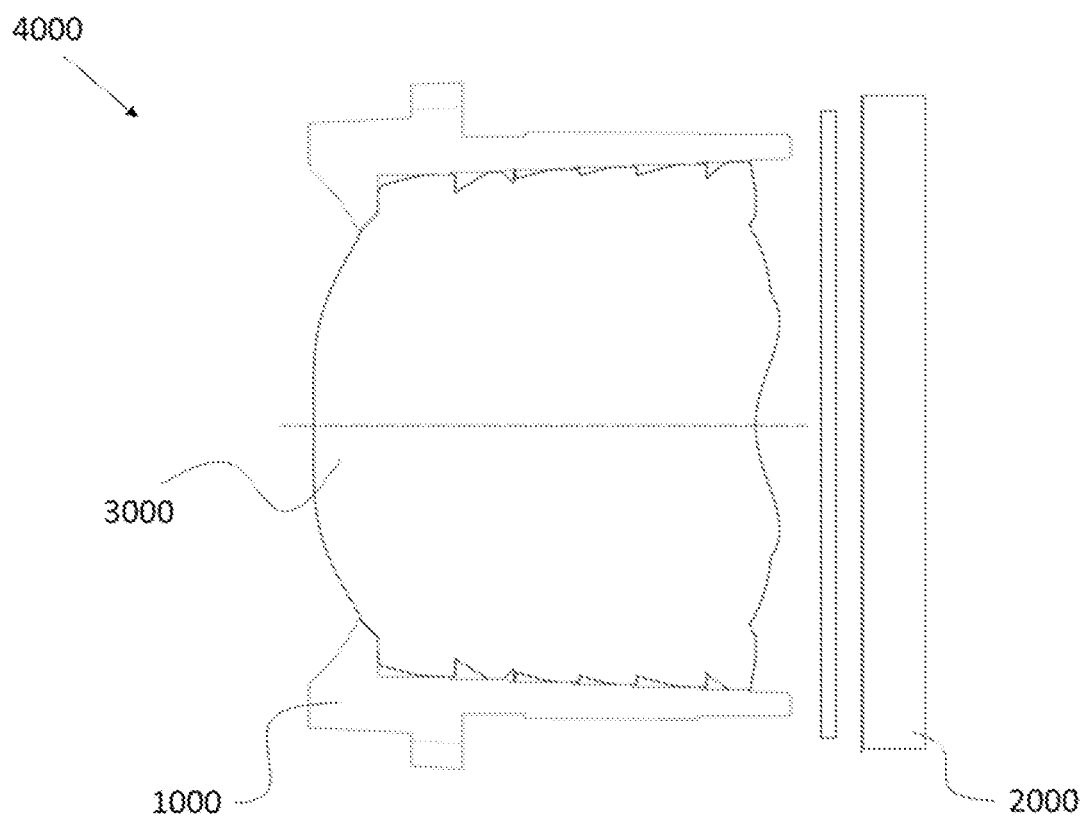
FIG. 8 is a schematic view of a photographing module according to an eighth embodiment of the present disclosure.

Refer to FIG. 8. FIG. 8 is a schematic view of a photographing module 4000 according to an eighth embodiment of the present disclosure. The photographing module includes a lens barrel 1000, an optical lens assembly 3000, and an image sensor 2000. The optical lens assembly 3000 can be the optical lens assemblies according to the above-mentioned embodiments, and the optical lens assembly 3000 is disposed in the lens barrel 1000. The image sensor 2000 is disposed on an image plane of the optical lens assembly 3000, and is an electronic photosensitive element (e.g., CMOS, CCD) with good sensitivity and low noise, so as to truly present the image quality of the optical lens assembly.

In the foregoing embodiments, those with ordinary knowledge in the art should understand that, in the optical lens assembly and the photographing module provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly provided in the present disclosure is applicable to an optical system that requires a large aperture and a larger field of view according to requirements, and has the characteristics of the large field of view and desirable image quality. The optical lens assembly is applicable to electronic imaging systems such as a mobile phone, a notebook computer, a digital drawing board, a mobile device, a digital camera, or vehicle photography in many aspects.

What is claimed is:

1. An optical lens assembly comprising a stop, and in order from an object side to an image side, comprising:
   a first lens with negative refractive power;
   a second lens with positive refractive power, comprising an object-side surface and an image-side surface, wherein the object-side surface of the second lens is convex near the optical axis, and the image-side surface of the second lens is convex near the optical axis;

a third lens with negative refractive power, comprising an object-side surface and an image-side surface, wherein the image-side surface of the third lens is concave near the optical axis;

a fourth lens with positive refractive power; and a fifth lens with positive refractive power, comprising an object-side surface and an image-side surface, wherein the object-side surface of the fifth lens is convex near the optical axis, and the image-side surface of the fifth lens is concave near the optical axis;

wherein a focal length of the fifth lens is f5, a curvature radius of an image-side surface of the fifth lens is R10, a distance from the stop to an image plane along the optical axis is SL, and the following conditions are satisfied:

$$1.27(mm) < f5*R10/SL < 3.68(mm).$$

2. The optical lens assembly according to claim 1, wherein a maximum image height of the optical lens assembly is IMH, an entrance pupil diameter of the optical lens assembly is EPD, and the following conditions are satisfied:

$$1.18 < IMH/EPD < 2.03.$$

3. The optical lens assembly according to claim 1, wherein a central thickness of the second lens along the optical axis is CT2, a central thickness of the third lens along the optical axis is CT3, a central thickness of the fourth lens along the optical axis is CT4, and the following condition is satisfied:

$$3.10 < (CT2+CT4)/CT3 < 7.05.$$

4. The optical lens assembly according to claim 1, wherein a distance from the image-side surface of the second lens to the object-side surface of the third lens along the optical axis is T23, a distance from the image-side surface of the third lens to the object-side surface of the fourth lens along the optical axis is T34, a distance from the image-side surface of the fourth lens to the object-side surface of the fifth lens along the optical axis is T45, and the following condition is satisfied:

$$3.53(mm) < (f5*T45)/(T23+T34) < 10.14(mm).$$

5. The optical lens assembly according to claim 1, wherein a curvature radius of an object-side surface of the first lens is R1, a central thickness of the first lens along the optical axis is CT1, a distance from the image-side surface of the first lens to the object-side surface of the second lens along the optical axis is T12, and the following condition is satisfied: –

$$74.49 < R1/(CT1+T12) < 290.59.$$

6. The optical lens assembly according to claim 1, wherein a maximum image height of the optical lens assembly is IMH, and the following condition is satisfied:

$$1.87 < SL/IMH < 3.14.$$

7. The optical lens assembly according to claim 1, wherein a distance from the object-side surface of the first lens to the image plane along the optical axis is TL, a maximum image height of the optical lens assembly is IMH, and the following conditions are satisfied:

$$2.89 < TL/IMH < 5.50.$$

8. The optical lens assembly according to claim 1, wherein a focal length of the optical lens assembly is f, and the following conditions are satisfied:

$$2.20 < SL/f < 3.67.$$

9. The optical lens assembly according to claim 1, wherein a half of a maximum field of view of the optical lens assembly is HFOV, and the following conditions are satisfied:

$$4.66 < \tan(HFOV)*f5/R10 < 12.04.$$

10. The optical lens assembly according to claim 1, wherein a distance from the object-side surface of the first lens to an image plane along the optical axis is TL, a distance from the image-side surface of the fifth lens to the image plane along the optical axis is BFL, a maximum image height of the optical lens assembly is IMH, a focal length of the optical lens assembly is f, and the following conditions are satisfied:

$$2.71(mm) < (TL-BFL)/IMH*f < 5.45(mm).$$

11. The optical lens assembly according to claim 1, wherein a distance from the object-side surface of the first lens to an image plane along the optical axis is TL, a maximum image height of the optical lens assembly is IMH, and the following conditions are satisfied:

$$1.02 < (TL-SL)/IMH < 2.36.$$

12. The optical lens assembly according to claim 1, wherein a focal length of the second lens is f2, a focal length of the optical lens assembly is f, and the following conditions are satisfied:

$$5.64 < (f5/f2)/(f/SL) < 17.98.$$

13. The optical lens assembly according to claim 1, wherein a focal length of the optical lens assembly is f, a maximum image height of the optical lens assembly is IMH, a curvature radius of the object-side surface of the first lens is R1, and the following conditions are satisfied:

$$-115.18 < f/IMH*(R1/R10) < 445.89.$$

14. The optical lens assembly according to claim 1, wherein an entrance pupil diameter of the optical lens assembly is EPD, a curvature radius of the object-side surface of the third lens is R5, a distance from the object-side surface of the first lens to an image plane along the optical axis is TL, a maximum image height of the optical lens assembly is IMH, and the following conditions are satisfied:

$$-40.32(mm*mm) < EPD*R5/(TL/IMH) < 21.89 (mm*mm).$$

15. A photographing module, comprising:

a lens barrel;

an optical lens assembly disposed in the lens barrel; and an image sensor disposed on an image plane of the optical lens assembly, wherein the optical lens assembly comprises a stop, and in order from an object side to an image side, comprises:

a first lens with negative refractive power;

a second lens with positive refractive power, comprising an object-side surface and an image-side surface, wherein the object-side surface of the second lens is convex near the optical axis, and the image-side surface of the second lens is convex near the optical axis;

a third lens with negative refractive power, comprising an object-side surface and an image-side surface, wherein the image-side surface of the third lens is concave near the optical axis;

a fourth lens with positive refractive power; and a fifth lens with positive refractive power, comprising an object-side surface and an image-side surface, wherein the object-side surface of the fifth lens is convex near the optical axis, and the image-side surface of the fifth lens is concave near the optical axis;

wherein a focal length of the fifth lens is f5, a curvature radius of an image-side surface of the fifth lens is R10, a distance from the stop to an image plane along the optical axis is SL, and the following conditions are satisfied:

$$1.27(mm) < f5*R10/SL < 3.68(mm).$$

16. The photographing module according to claim 15, wherein a distance from the image-side surface of the second lens to the object-side surface of the third lens along the optical axis is T23, a distance from the image-side surface of the third lens to the object-side surface of the fourth lens along the optical axis is T34, a distance from the image-side surface of the fourth lens to the object-side surface of the fifth lens along the optical axis is T45, and the following condition is satisfied:

$$3.53(mm) < (f5*T45)/(T23+T34) < 10.14(mm).$$

17. The photographing module according to claim 15, wherein a curvature radius of an object-side surface of the first lens is R1, a central thickness of the first lens along the optical axis is CT1, a distance from the image-side surface of the first lens to the object-side surface of the second lens along the optical axis is T12, and the following condition is satisfied: −

$$74.49 < R1/(CT1+T12) < 290.59.$$

18. The photographing module according to claim 15, wherein a half of a maximum field of view of the optical lens assembly is HFOV, and the following conditions are satisfied:

$$4.66 < \tan(HFOV)*f5/R10 < 12.04.$$

19. The photographing module according to claim 15, wherein a distance from the object-side surface of the first lens to an image plane along the optical axis is TL, a distance from the image-side surface of the fifth lens to the image plane along the optical axis is BFL, a maximum image height of the optical lens assembly is IMH, a focal length of the optical lens assembly is f, and the following conditions are satisfied:

$$2.71(mm) < (TL-BFL)/IMH*f < 5.45(mm).$$

20. The photographing module according to claim 15, wherein an entrance pupil diameter of the optical lens assembly is EPD, a curvature radius of the object-side surface of the third lens is R5, a distance from the object-side surface of the first lens to an image plane along the optical axis is TL, a maximum image height of the optical lens assembly is IMH, and the following conditions are satisfied:

$$-40.32(mm*mm) < EPD*R5/(TL/IMH) < 21.89(mm*mm).$$

* * * * *